US011321846B2

(12) United States Patent
Cao et al.

(10) Patent No.: US 11,321,846 B2
(45) Date of Patent: May 3, 2022

(54) DEVICES, SYSTEMS, AND METHODS FOR TOPOLOGICAL NORMALIZATION FOR ANOMALY DETECTION

(71) Applicant: Canon Virginia, Inc., Newport News, VA (US)

(72) Inventors: Xiwu Cao, Arcadia, CA (US); Bradley Scott Denney, Irvine, CA (US)

(73) Assignee: Canon Virginia, Inc., Newport News, VA (US)

( * ) Notice: Subject to any disclaimer, the term of this patent is extended or adjusted under 35 U.S.C. 154(b) by 89 days.

(21) Appl. No.: 16/828,831

(22) Filed: Mar. 24, 2020

(65) Prior Publication Data

US 2020/0311944 A1  Oct. 1, 2020

Related U.S. Application Data

(60) Provisional application No. 62/884,059, filed on Aug. 7, 2019, provisional application No. 62/825,541, filed on Mar. 28, 2019, provisional application No. 62/825,530, filed on Mar. 28, 2019.

(51) Int. Cl.
*G06T 7/12* (2017.01)
*G06T 7/50* (2017.01)
*G06T 7/136* (2017.01)
*G06T 7/00* (2017.01)

(52) U.S. Cl.
CPC .............. *G06T 7/12* (2017.01); *G06T 7/0004* (2013.01); *G06T 7/136* (2017.01); *G06T 7/50* (2017.01)

(58) Field of Classification Search
CPC .. G06T 7/12; G06T 7/50; G06T 7/136; G06T 2207/30164
See application file for complete search history.

(56) References Cited

U.S. PATENT DOCUMENTS

| 6,005,978 | A | 12/1999 | Garakani |
| 6,320,976 | B1 | 11/2001 | Murthy |
| 7,318,005 | B1 | 1/2008 | Smaragdis |
| 7,440,607 | B1 | 10/2008 | Lin |
| 7,715,623 | B2 | 5/2010 | Ling |

(Continued)

OTHER PUBLICATIONS

J. Hassan et al., Welding Defect Detection and Classification Using Geometric Features, Dec. 2012.

(Continued)

*Primary Examiner* — John B Strege
(74) *Attorney, Agent, or Firm* — Canon U.S.A., Inc. IP Division

(57) ABSTRACT

Some embodiments of devices, systems, and methods obtain at least one first image, wherein the at least one first image is defined in an image space; select at least one feature in the at least one first image; define a topology based on the at least one feature; generate a topology mapping between the topology and the image-space topology; obtain a plurality of anomaly scores, wherein each anomaly score of the plurality of anomaly scores was generated based on a respective detection area in a second image; map the plurality of anomaly scores to the topology based on the topology mapping; and normalize each anomaly score in the plurality of anomaly scores based on the respective neighboring anomaly scores in the topology, thereby generating normalized anomaly scores.

19 Claims, 28 Drawing Sheets

(56) References Cited

U.S. PATENT DOCUMENTS

| | | | |
|---|---|---|---|
| 8,107,717 B2 | 1/2012 | Maeda | |
| 8,131,107 B2 | 3/2012 | Sun | |
| 8,238,635 B2 | 8/2012 | Can | |
| 8,345,949 B2 | 1/2013 | Zhao | |
| 8,442,301 B2 | 5/2013 | Dragovich | |
| 8,867,787 B2 | 10/2014 | Singamsetti | |
| 9,158,976 B2 | 10/2015 | Datta | |
| 9,170,543 B2 | 10/2015 | Arakawa | |
| 9,256,920 B1 | 2/2016 | Choudhury | |
| 9,378,552 B2 | 6/2016 | Sato | |
| 9,400,256 B2 | 7/2016 | Henderkott | |
| 9,405,991 B2 | 8/2016 | Sharma | |
| 9,460,490 B2 | 10/2016 | Choudhury | |
| 9,619,755 B2 | 4/2017 | Wang | |
| 10,108,845 B2 | 10/2018 | Wu | |
| 10,164,991 B2 | 12/2018 | Savalle | |
| 10,387,445 B2 * | 8/2019 | Limonad | G06F 16/26 |
| 2009/0238432 A1 | 9/2009 | Can | |
| 2009/0279772 A1 * | 11/2009 | Sun | G06T 7/35 |
| | | | 382/141 |
| 2013/0148987 A1 | 6/2013 | Arakawa | |
| 2014/0270489 A1 | 9/2014 | Lim | |
| 2014/0348415 A1 | 11/2014 | Bhattad | |
| 2015/0227809 A1 | 8/2015 | Alpert | |
| 2017/0140516 A1 | 3/2017 | Maher | |
| 2018/0114092 A1 | 4/2018 | Huang | |
| 2020/0003700 A1 * | 1/2020 | Sofer | G01N 21/956 |
| 2020/0242496 A1 * | 7/2020 | Salasoo | B29C 64/393 |
| 2020/0379863 A1 * | 12/2020 | Marwah | G06K 9/6262 |

OTHER PUBLICATIONS

Nick Kingsbury, Complex Wavelets for Shift Invariant Analysis and Filtering of Signals, May 2001.

Roumen Kountchev et al., Defects detection in X-ray images and photos, Feb. 2011.

V Lashkia, Defect detection in X-ray images using fuzzy reasoning, Image and Vision Computing, vol. 19, Issue 5, Apr. 2001, Abstract.

Shekhar B. Sastry, Computationally Efficient Methods for Shift-variant Image Restoration in Two and Three Dimensions, Sep. 2011.

Ian T. Young et al., Fundamentals of Image Processing, Jul. 2004.

Tian Yuan et al., Automatic Defect Detection in X-Ray Images Using Image Data Fusion, Dec. 2006.

Caixia Zheng et al., An improved method for object detection in astronomical images, Jun. 2015.

Bill Basener et al., Anomaly Detection using Topology, Proc. of SPIE vol. 6565, Apr. 2007.

Kai-Wen Cheng et al., Gaussian Process Regression Based Video Anomaly Detection and Localization With Hierarchical Feature Representation, IEEE Transactions on Image Processing, Sep. 2015.

\* cited by examiner

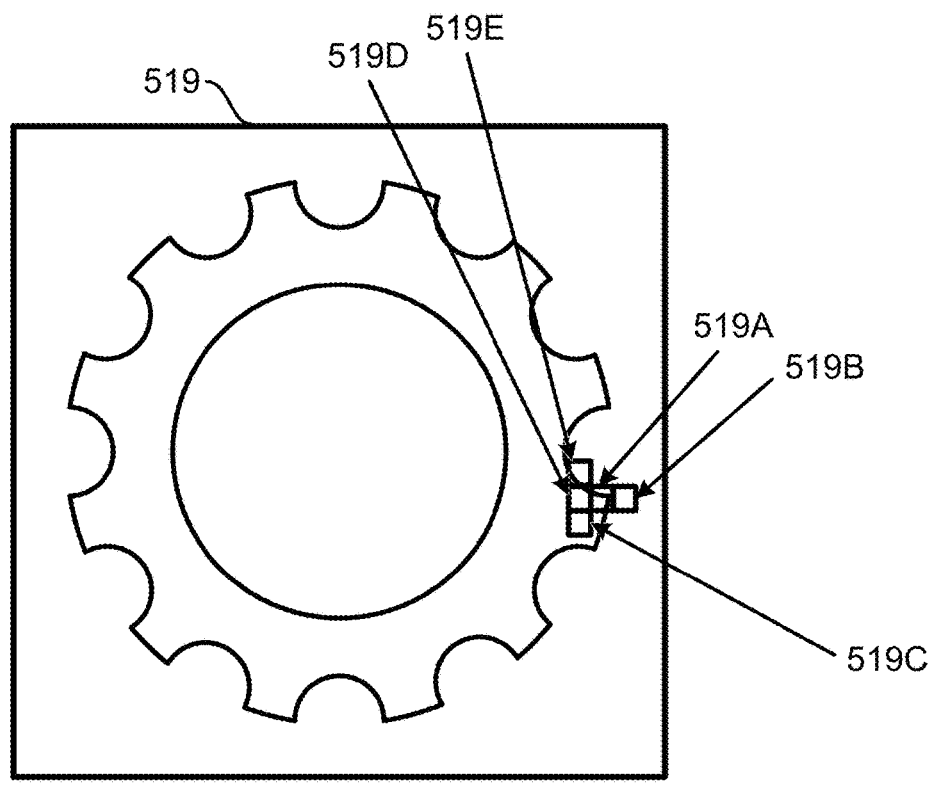
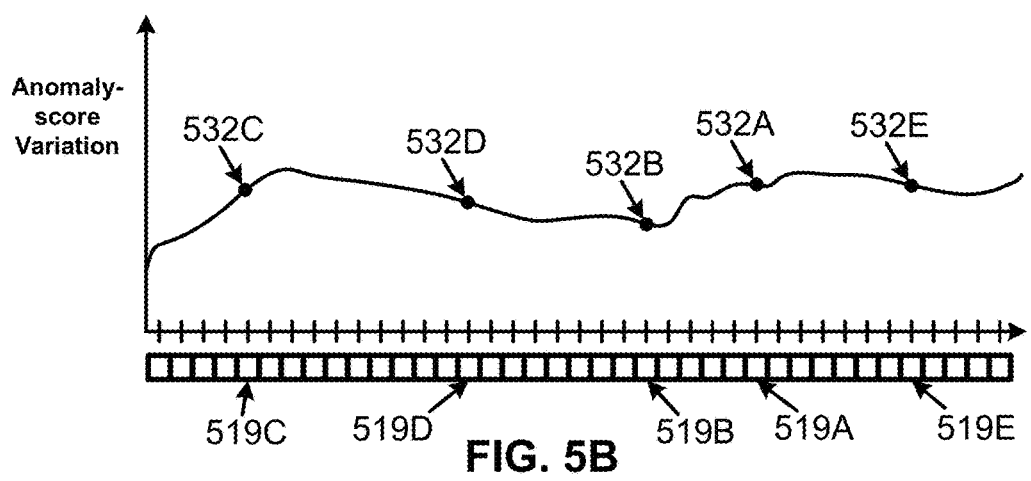
FIG. 5A
FIG. 5B

DEVICES, SYSTEMS, AND METHODS FOR TOPOLOGICAL NORMALIZATION FOR ANOMALY DETECTION

CROSS-REFERENCE TO RELATED APPLICATIONS

This application claims the benefit of U.S. Application No. 62/825,530, which was filed on Mar. 28, 2019; of U.S. Application No. 62/825,541, which was filed on Mar. 28, 2019; and of U.S. Application No. 62/884,059, which was filed on Aug. 7, 2019.

BACKGROUND

Technical Field

This application generally concerns detecting anomalies in images.

Background

Nondestructive testing techniques are used to examine the properties of objects without causing damage to the objects. These techniques can be used in a quality-control process to identify defects in the object.

SUMMARY

Some embodiments of a device comprise one or more computer-readable storage media; and one or more processors that are in communication with the one or more computer-readable storage media. Also, the one or more processors are configured to cause the device to perform operations that include obtaining at least one first image, wherein the at least one first image is defined in an image space; selecting at least one feature in the at least one first image; defining a topology based on the at least one feature; generating a topology mapping between the topology and the image-space topology; obtaining a plurality of anomaly scores, wherein each anomaly score of the plurality of anomaly scores was generated based on a respective detection area in a second image; mapping the plurality of anomaly scores to the topology based on the topology mapping; and normalizing each anomaly score in the plurality of anomaly scores based on the respective neighboring anomaly scores in the topology, thereby generating normalized anomaly scores.

Some embodiments of a method comprise obtaining a mapping from an image-space topology to a first topology; obtaining anomaly scores for respective detection areas in an image, wherein the respective detection areas in the image are defined in the image-space topology; mapping the anomaly scores to the first topology based on the mapping; statistically characterizing the anomaly scores in the first topology; and adjusting the anomaly scores based on the statistical characterization.

Some embodiments of one or more computer-readable storage media store computer-executable instructions that, when executed by one or more computing devices, cause the one or more computing devices to perform operations that comprise obtaining a plurality of anomaly scores, wherein each anomaly score of the plurality of anomaly scores corresponds to a respective detection area in an image, wherein the image is defined in an image-space topology; adjusting at least one anomaly score of the plurality of anomaly scores based on the anomaly scores that are in a respective neighborhood of the at least one anomaly score, thereby generating adjusted anomaly scores; and identifying one of more of the adjusted anomaly scores that exceed a threshold.

BRIEF DESCRIPTION OF THE DRAWINGS

FIG. 5A illustrates an example embodiment of an image of an object and an example embodiment of a topology that is not the image-space topology.

FIG. 5B illustrates an example embodiment of the anomaly-score variations of the pixels in the topology that is shown in FIG. 5A.

DESCRIPTION

The following paragraphs describe certain example embodiments. Other embodiments may include alternatives, equivalents, and modifications. Additionally, the example embodiments may include several novel features, and a particular feature may not be essential to some embodiments of the devices, systems, and methods that are described herein.

Figure 1:
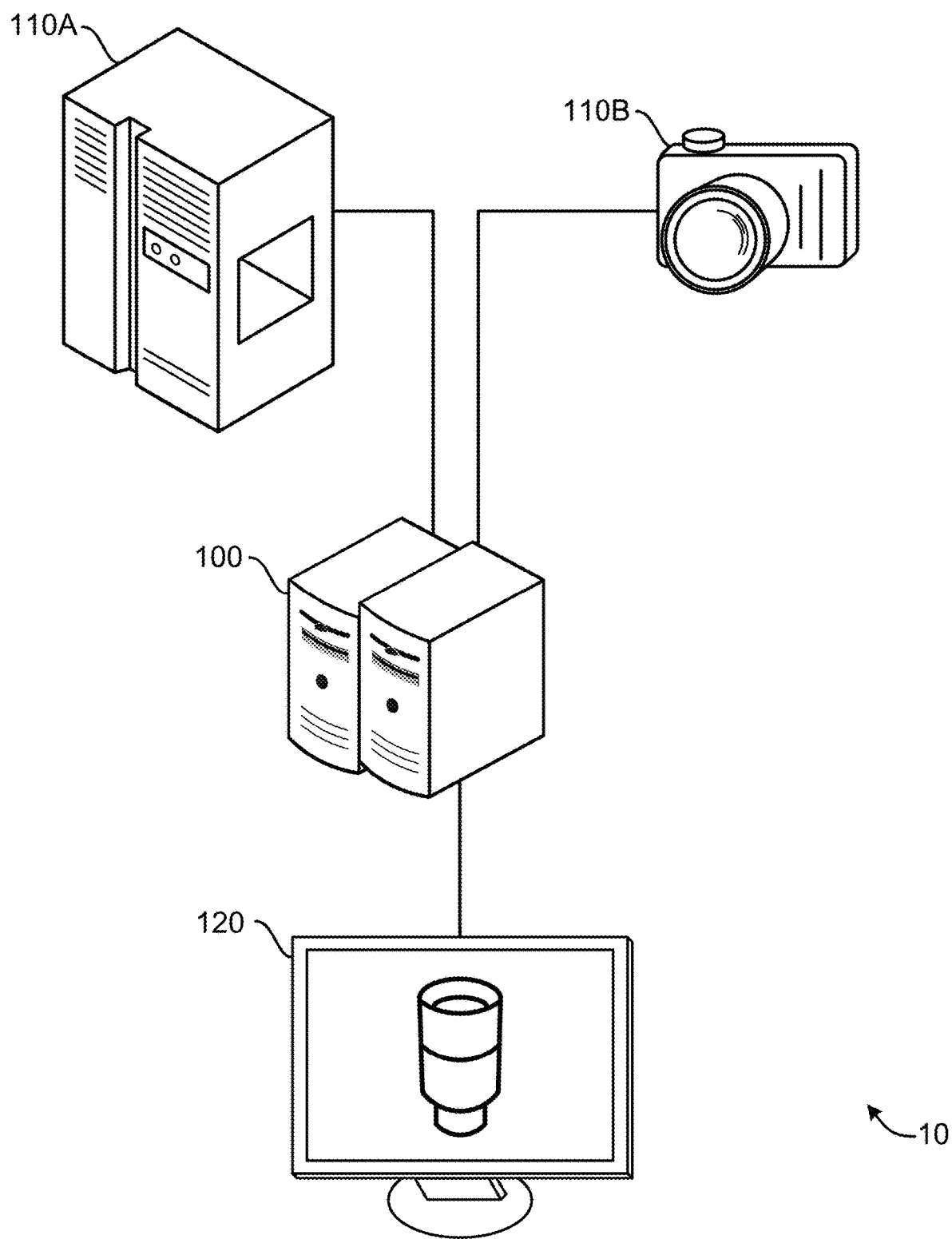
FIG. 1 illustrates an example embodiment of a system for anomaly detection.

FIG. 1 illustrates an example embodiment of a system for anomaly detection. The system 10 includes one or more detection devices 100, which are specially-configured computing devices; one or more image-capturing devices, such as an x-ray detector 110A or a camera 110B; and at least one display device 120.

The system 10 detects anomalies in images (e.g., x-ray images) by generating anomaly-detection scores (which may be referred to herein as "anomaly scores") and then detecting anomalies based on the output anomaly-detection scores. An anomaly in an image (e.g., an anomaly-score image) of an object may indicate a defect or anomaly in the object. For example, during non-destructive testing of a component, images of the component can be used to identify where the component has anomalies, defects, or other imperfections, if any. Also, in the following description, an image may be a subset of a larger image. For example, an image may be generated by cropping a larger image (e.g., during a preprocessing operation).

An anomaly score indicates the probability that a detection area (e.g., a region, pixel, or voxel of data) in an image is different from the natural variation of that detection area in a set of images (e.g., a set of training images). Additionally, the anomaly scores may be arranged into an anomaly-score image in which the detection area in the image has the value of the respective detection area's anomaly score. For example, in some embodiments the anomaly scores are binary (an anomaly score can be either 0 or 1). In such embodiments, an anomaly score may be generated for each detection area in an image, and then a binary anomaly-score image, where 0 indicates a normal detection area and 1 indicates an abnormal detection area, may be generated from the anomaly scores. Although the following description uses pixels as the detection areas, some of the embodiments use other detection areas, such as image regions (groups of pixels) or voxels of data.

In some cases, anomaly scores may still exhibit variations specific to each test image that may not be observed in the training data. For example, in x-ray images of super-alloys, x-ray diffraction can occur when imaging some parts of an object, but the diffraction may create anomaly scores that are statistically different than those observed in training data. Also for example, crystal alloy castings can exhibit x-ray diffraction due to the regularly spaced atoms in the crystal structure, which may appear as spatially localized imaging noise. The pattern of this noise may not be repeatable across different instances of the castings, and this noise may cause the anomaly statistics to take on a non-standard nature. Furthermore, x-ray diffraction effects may also be greater in regions of a casting image where the object is thickest (and thus absorbs more x-rays), and this may create a non-standard effect that is image-intensity dependent. Moreover, problems with image alignment can cause modeling failures or breakdown in regions of sharp intensity transitions (e.g., edges), which can create a non-standard effect on some edges in the anomaly image.

The one or more detection devices 100 may compensate for variations in the anomaly scores by defining one or more topologies (that are not the image-space topology) based on the anomaly-score data and by defining one or more respective neighborhoods in each of the one or more topologies. Each topology defines how the elements (e.g., pixels) of a set (e.g., the pixels in an image) spatially relate to each other. And the one or more detection devices 100 may adjust (e.g., normalize) the anomaly scores for the anomaly-score image based on one or more of the neighborhoods in the one or more topologies that are different from the image-space topology.

Also, some embodiments of the one or more detection devices 100 may compensate for variations in the anomaly scores by implementing a two-stage or four-stage post-processing anomaly detection that identifies both the number and the sizes of the anomaly regions by using an adaptive threshold. In some circumstances, when using (either initially or eventually) binary classification at each pixel to detect anomalies, the initial binary-classification detection results can be very noisy. The four-stage post-processing anomaly detection can improve the binary-classification detection results.

Figure 2:
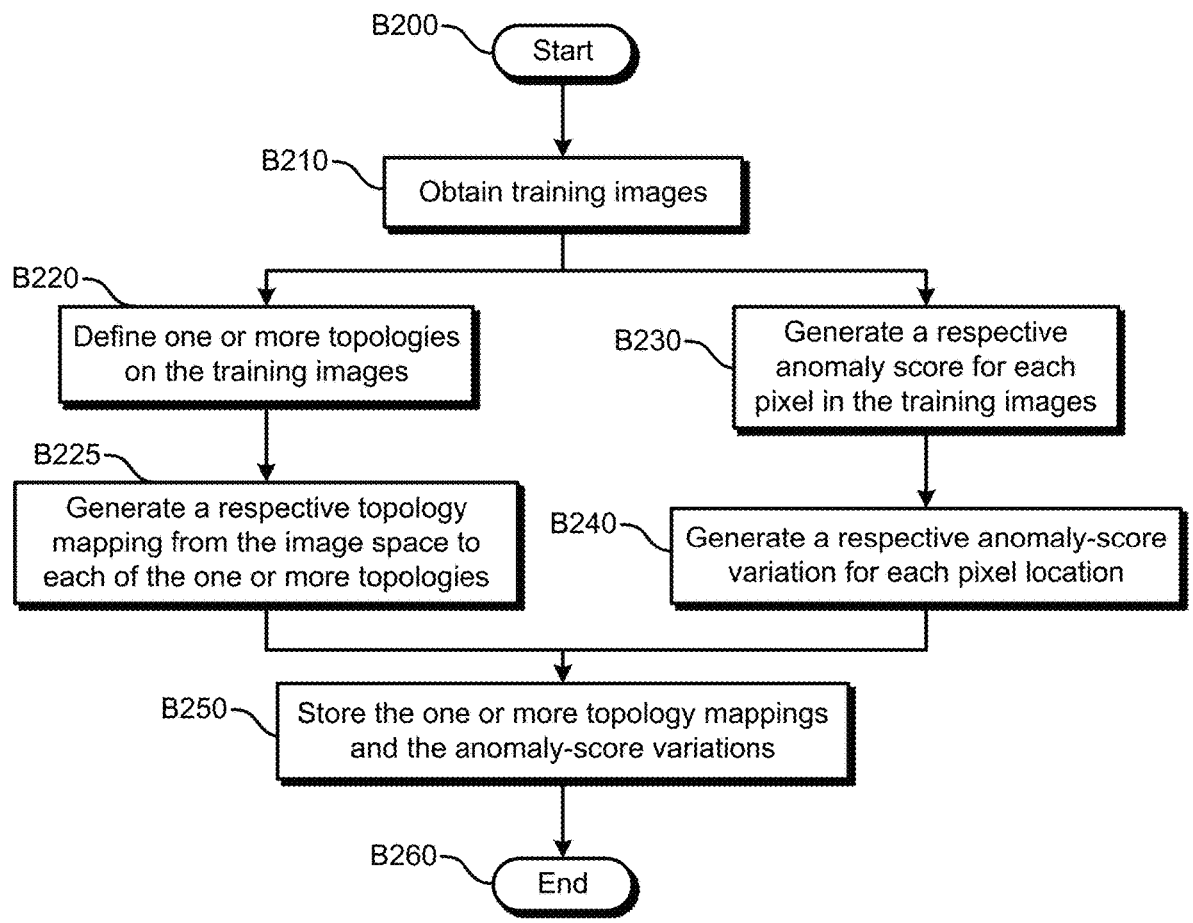
FIG. 2 illustrates an example embodiment of an operational flow for defining a topology and generating anomaly-score variations.

FIG. 2 illustrates an example embodiment of an operational flow for defining a topology and generating anomaly-score variations. Although this operational flow and the other operational flows that are described herein are each presented in a certain respective order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations (e.g., blocks) from more than one of the operational flows that are described herein. Thus, some embodiments of the operational flows may omit blocks, add blocks (e.g., include blocks from other operational flows that are described herein), change the order of the blocks, combine blocks, or divide blocks into more blocks relative to the example embodiments of the operational flows that are described herein.

Furthermore, although this operational flow and the other operational flows that are described herein are performed by a detection device, some embodiments of these operational flows are performed by two or more detection devices or by one or more other specially-configured computing devices.

Figure 3:
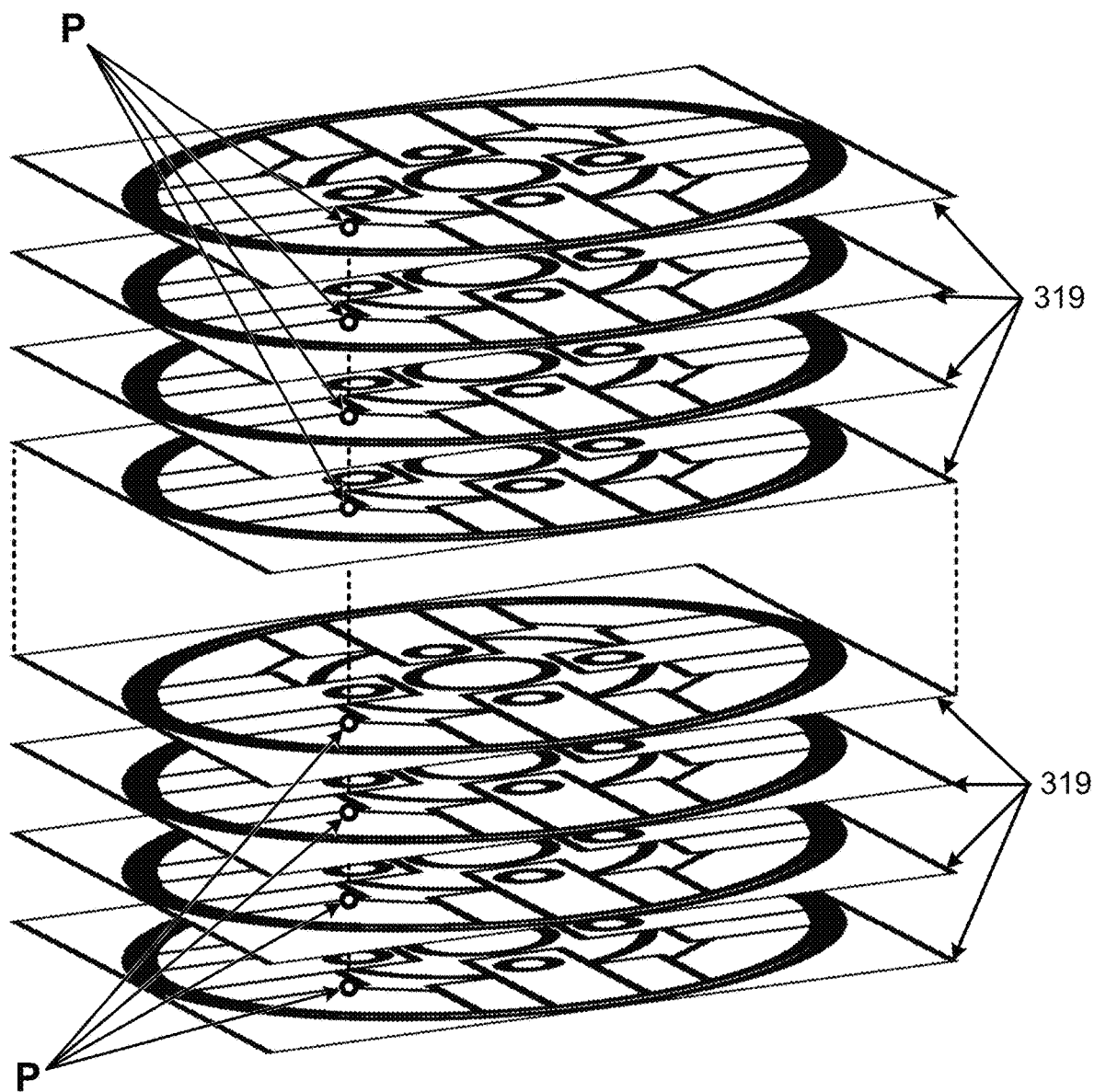
FIG. 3 illustrates an example embodiment of a set of training images.

The operational flow in FIG. 2 starts in block B200 and then proceeds to block B210, where the detection device obtains training images. The detection device may also align the training images and perform other preprocessing (e.g., intensity adjustment, warping, cropping) on the training images. FIG. 3 illustrates an example embodiment of a set of training images 319 of an object or instances of an object.

In this embodiment, the training images 319 have been aligned such that pixels at the same x-y coordinates depict the same part of the object. For example, each of the training image 319 includes a respective pixel P, and all of the pixel Ps are aligned across the training images 319 such that all of the pixel Ps have the same x-y coordinates and all of the pixel Ps depict the same part of the object.

Next, the flow splits into a first flow and a second flow. The first flow moves to block B220, where the detection device defines one or more topologies on the training images.

Figure 4:
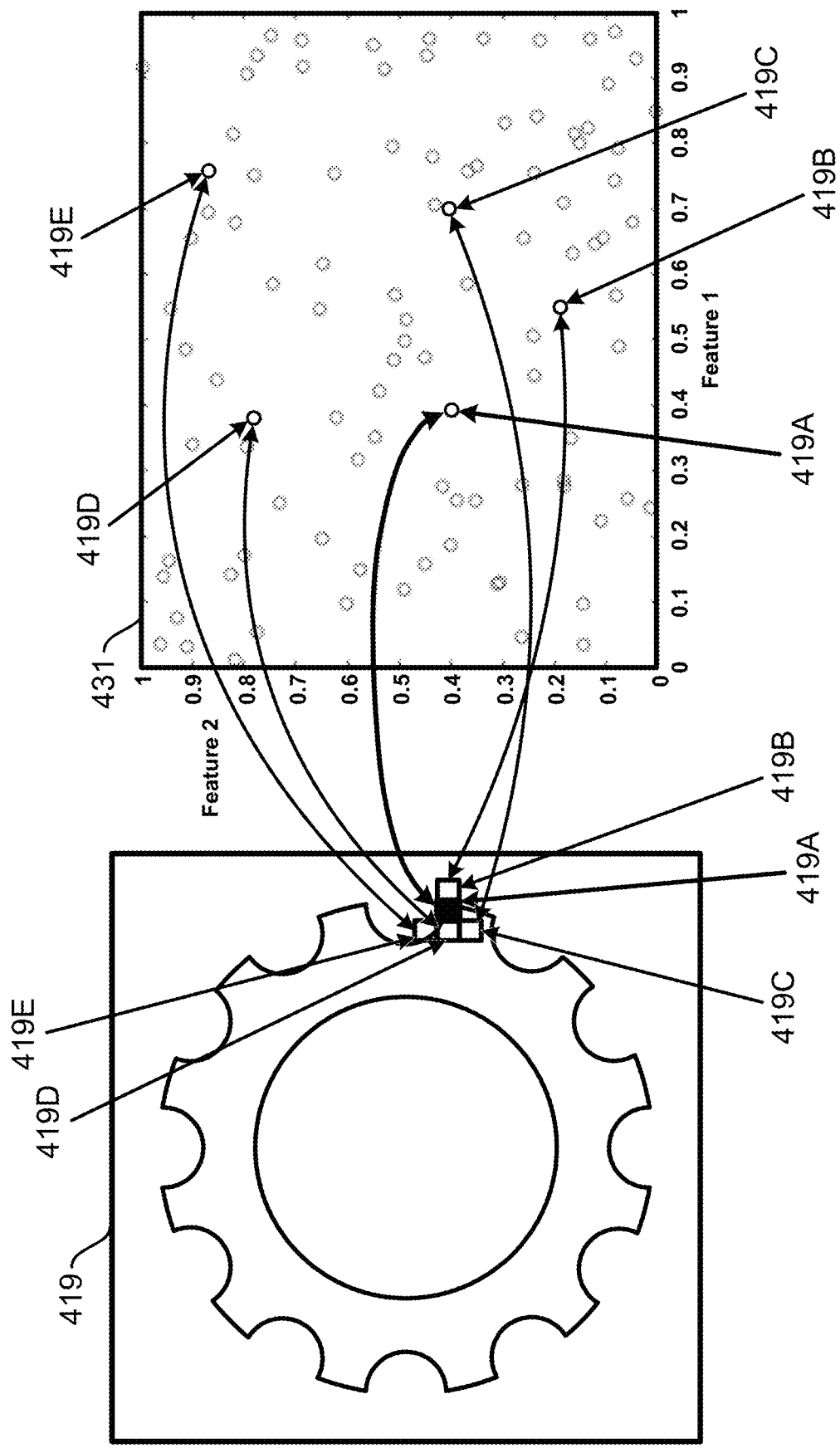
FIG. 4 illustrates an example embodiment of an image of an object and an example embodiment of a topology that is not the image-space topology.

For example, FIG. 4 illustrates an example embodiment of an image 419 of an object and an example embodiment of a topology 431 that is not the image-space topology. This topology 431 is defined in a two-dimensional feature space, and the two features that form the basis of the two dimensions are features of the pixels in the image 419 of the object, although these features of the pixels are different from the features that define the image-space topology of the image 419. For example, feature 1 and feature 2 may be features of each pixel in an image or of each corresponding pixel in a plurality of aligned images (e.g., multiple images each of a respective instance of the same type of object). Each pixel in the image 419 may be mapped to a point in the topology 431 based on the two features. Examples of features include pixel intensity, mean pixel intensity, median pixel intensity, pixel location, pixel gradient magnitude, and pixel gradient angle.

Each element (e.g., pixel) in a topology (e.g., the topology 431 in FIG. 4) has neighboring elements in the topology. In the image-space topology (the topology of the image 419), the spatial relationships of the pixels are defined by the image 419. Thus, in the image-space topology, the neighboring pixels of a pixel are the pixels that surround the pixel in the image 419. However, when each pixel is represented in a topology that is defined by different features than the features that define the image-space topology, then a respective pixel may have a neighborhood (neighboring pixels) that is different from the pixel's neighborhood in the image-space topology. Thus, in the topology 431, a pixel's neighboring pixels may not be the same as the pixel's neighboring pixels in the image-space topology of the image 419. For example, in FIG. 4 the neighboring pixels 419B-E of a first pixel 419A in the image 419 (the image-space topology) are different from the neighboring pixels of the first pixel 419A in the topology 431.

Also for example, FIG. 5A illustrates an example embodiment of an image 519 of an object and an example embodiment of a topology 531 that is not the image-space topology. The feature that forms the basis of this topology is pixel intensity (thus the topology 531 is one dimensional), and in the topology 531 the pixels in the image 519 are sorted in order of intensity. When generating the topology 531 from a set of training images (e.g., as shown in FIG. 3), the pixel intensity may be the mean or the median intensity at the pixel location (e.g., the location of pixel Ps) across the training images, and the topology may be generated by sorting the pixel positions in order of mean or median intensity. In this example, the neighboring pixels 519B-E of a first pixel 519A in the image 519 are different from the neighboring pixels of the first pixel 519A in the topology 531.

Additionally, some topologies order pixels by the mean or median gradient magnitude at the corresponding pixel locations in the training images. Also, some topologies represent pixels in a higher-dimensional space that may include two or more of the following: one or more dimensions that represent the pixels' locations in the image, one or more dimensions that represent the pixels' typical intensity (e.g., mean or median), one or more dimensions that represent the derivatives or gradients across the spatial dimensions, one or more dimensions that represent the amount of variation in the training images, and one or more dimensions that represent the percentage of inliers or outliers in the training data. Also, in the higher-dimensional space, local averaging may be performed. For example the median magnitude of the x and y direction Sobel edge detection filters on the training images may be used to create an ordering of the image pixels based on the magnitude of local change. Furthermore, each of these dimensions is an example of a feature, and other features may be used in this manner to create additional topologies.

Referring again to FIG. 2, from block B220, the first flow move to block B225, where the detection device generates a respective topology mapping (e.g., a sort order for a one-dimensional topology) for each topology that maps the image space to the topology and vice versa. Thus, the detection device can use the topology mapping to map a pixel in the image to the topology and to map a value in the topology to a pixel in the image. After block B225, the first flow proceeds to block B250.

The second flow moves from block B210 to block B230, where the detection device generates (e.g., calculates) a respective raw anomaly score for each pixel in the training images. For example, some embodiments of the detection device generate raw anomaly scores according to one or more of the embodiments that are described in U.S. application Ser. No. 16/678,880. Also, in some embodiments in which the detection areas are not individual pixels, the raw anomaly scores are generated according to one or more of the embodiments that are described in U.S. Pat. No. 10,410,084.

Then, in block B240 the detection devices generates a respective anomaly-score variation for each pixel location in the training images. For example, referring to the pixel Ps in FIG. 3, a respective raw anomaly score is generated for each of the pixel Ps, and the variation at the location of the pixel Ps is generated based on the raw anomaly scores. Also for example, in some embodiments the anomaly-score variation at a pixel location is a standard deviation of all of the raw anomaly scores. For example, referring to FIG. 3, in such embodiments the anomaly-score variation at the location of the pixel Ps would be the standard deviation of the raw anomaly scores of the pixel Ps. Also for example, FIG. 5B illustrates an example embodiment of the anomaly-score variations of the pixels in the topology 531 that is shown in FIG. 5A. FIG. 5B highlights the anomaly-score variations of the first pixel 519A and the neighboring pixels 519B-E.

After block B240, the second flow moves to block B250.

And in block B250, the detection device stores the one or more topology mappings and the anomaly score variations, and the flow ends in block B260.

Figure 6:
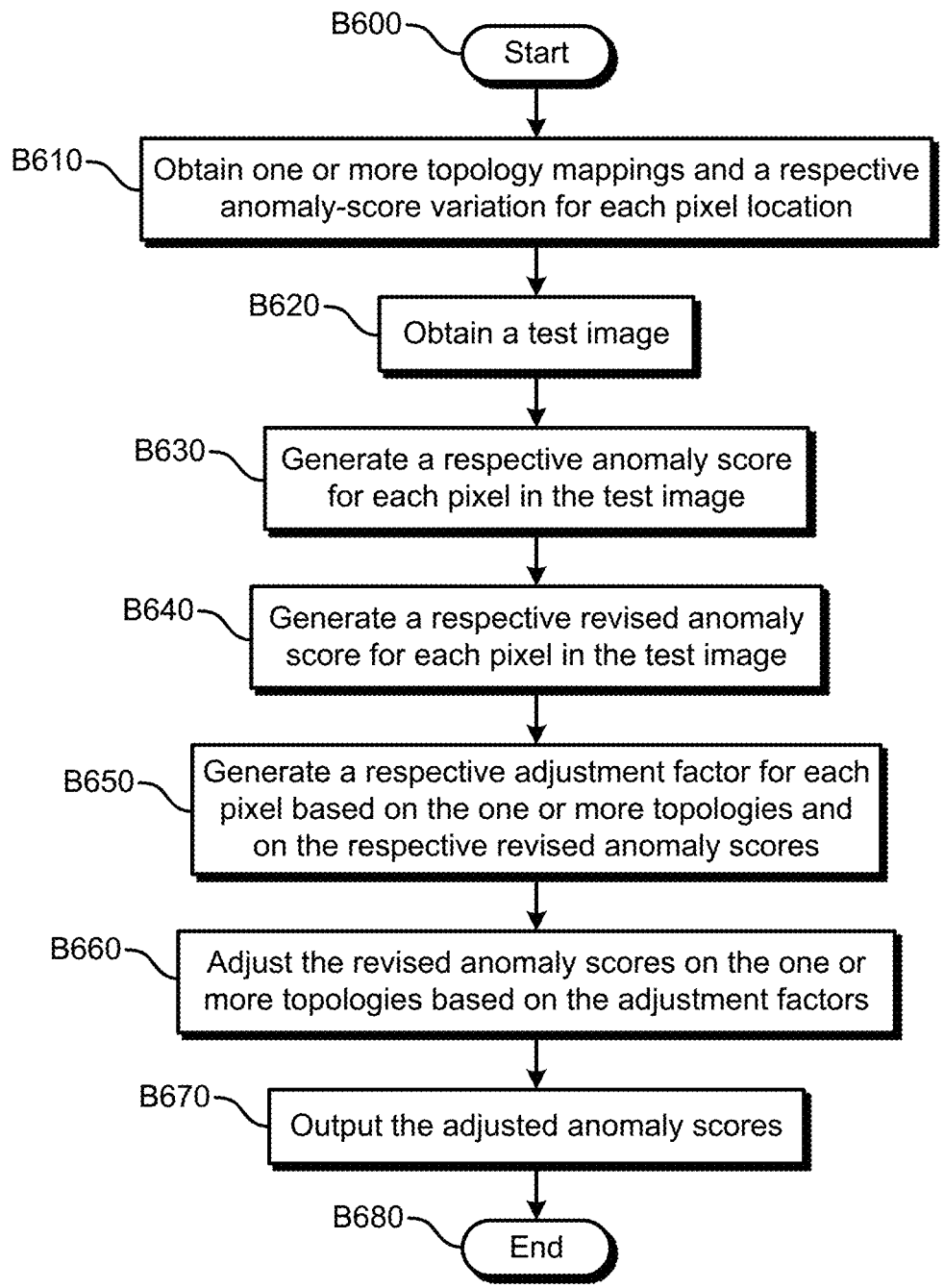
FIG. 6 illustrates an example embodiment of an operational flow for generating normalized anomaly scores.

FIG. 6 illustrates an example embodiment of an operational flow for generating normalized anomaly scores. The flow starts in block B600 and then moves to block B610, where a detection device obtains one or more topology mappings and a respective anomaly-score variation for each pixel location in the one or more topologies. Each of the one or more topology mappings maps a pixel in an image to a location in the respective topology.

Next, in block B620, the detection device obtains a test image. Then, in block B630, the detection device generates a respective raw anomaly score for each pixel in the test image.

The flow then moves to block B640, where the detection device generates a respective revised anomaly score for each pixel in the test image based on the pixel's raw anomaly scores generated in block B630 and on the anomaly-score variations obtained in block B610. For example, in some embodiments, a raw anomaly score ε of a pixel is defined as some error or deviation from a norm, and the revised anomaly score for the pixel is the raw anomaly score divided by the anomaly-score variation at that pixel as observed across a set of training images. Also for example, in some embodiments where the anomaly-score variation is a standard deviation $\sigma_\varepsilon$ of the raw anomaly scores ε at a pixel, the revised anomaly score of the pixel can be described by the following: $|\varepsilon|/\sigma_\varepsilon$.

The flow then proceeds to block B650. In block B650, the detection device uses the topology mappings to map the pixels in the test image to the one or more topologies and generates a respective adjustment factor for each pixel in the test image based on the one or more topologies and on the respective revised anomaly scores. In block B650, the detection device maps the pixels in the test image to the one or more topologies and then, in the one or more topologies, generates the respective adjustment factor for each pixel based on the revised anomaly scores. To generate the adjustment factors, the detection device may perform local statistical estimation on the revised anomaly scores of the pixels over the topology.

For example, in block B650, some embodiments of the detection device perform local smoothing or averaging on the revised anomaly scores in a topology where a statistical sample mean is measured across a local neighborhood in the topology. Some embodiments use a smoothing kernel (e.g., a Gaussian kernel) on the revised anomaly scores in the topology to perform the smoothing.

Also, some topologies are multi-dimensional topologies. To perform the local statistical estimation on the revised anomaly scores on a multi-dimensional topology, some embodiments of the detection device define a similarity or dis-similarity measure on the multidimensional topology. For example, neighborhoods of arbitrary radii may be defined to find a sufficient number of samples (e.g., revised anomaly scores) to apply local smoothing or averaging. In some embodiments, the K-nearest neighbors are used to create a fixed sample size when collecting local statistics. And in some embodiments, the neighborhood may be defined by a fixed radius or grid, and the sample size may vary depending on how many sample fall in the neighborhood. Also, in some embodiments, prior probabilities are used to prevent over-estimation when the sample size is low. For example, if the expected mean prior is $\mu_0$, then, in some embodiments, the mean of the samples x over a neighborhood $\mathcal{N}$ can be described by the following:

$$\mu = \frac{\sum_\mathcal{N} x + k\mu_0}{N + k},$$

where N is the number of samples in the neighborhood $\mathcal{N}$, where k is a factor related to balancing sample size with confidence in the mean, and where μ is the mean of the samples x (μ may also be an adjustment measure). Such embodiments may bias the mean estimate towards the prior mean. But when N>>k, the factor k has very little influence. And some embodiments use graph theoretic techniques on a similarity measure to transform the topological space to a manifold on a graph. These spectral embedding techniques may produce a different topology, possibly having fewer dimensions. However, the different topology may still be multi-dimensional.

In some embodiments of block B650, the detection device outputs the adjustment factors in the form of an adjustment map. The adjustment map may have the same dimensionality as a topology and have a respective adjustment factor for each revised anomaly score at the corresponding location of the revised anomaly score in the topology. For example, if the topology is a one-dimensional topology, then the adjustment map may be one dimensional and may have an adjustment factor at the location of each revised anomaly score.

Figure 7:
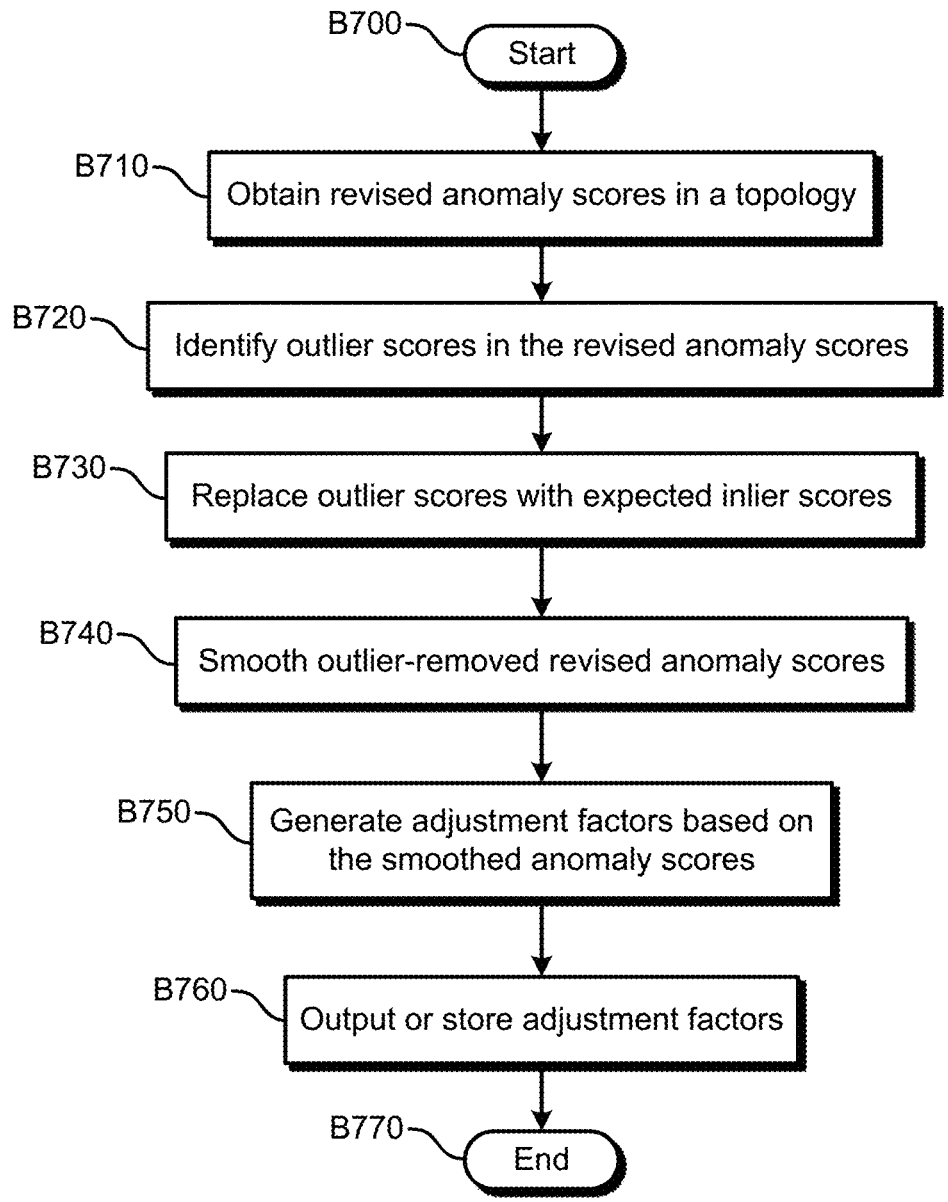
FIG. 7 illustrates an example embodiment of an operational flow for generating adjustment factors.

Also, in block B650, some embodiments of the detection device generate the adjustment factors as described in FIG. 7.

The flow then moves to block B660, where the detection device adjusts (e.g., locally normalizes) the revised anomaly scores on the one or more topologies based on the adjustment factors. For example, in embodiments in which the detection device generates a respective adjustment factor for each revised anomaly score in a topology, the detection device adjusts each revised anomaly score on the topology based on that anomaly score's respective adjustment factor.

Next, in block B670, the detection device outputs the adjusted anomaly scores. Some embodiments of the detection device use the one or more topology mappings to map the adjusted anomaly scores of the pixels to the respective positions of the pixels in the test image, thereby producing an image in which the pixels have the same positions as they do in the test image, but the original pixel values in the test image, or the anomaly scores in an anomaly-score image, have been replaced with the adjusted anomaly scores. Finally, the flow ends in block B680.

FIG. 7 illustrates an example embodiment of an operational flow for generating adjustment factors. The flow starts in block B700 and moves to block B710, where a detection device obtains revised anomaly scores in a topology. For example, the revised anomaly scores may be generated as described in block B640.

Figure 8:
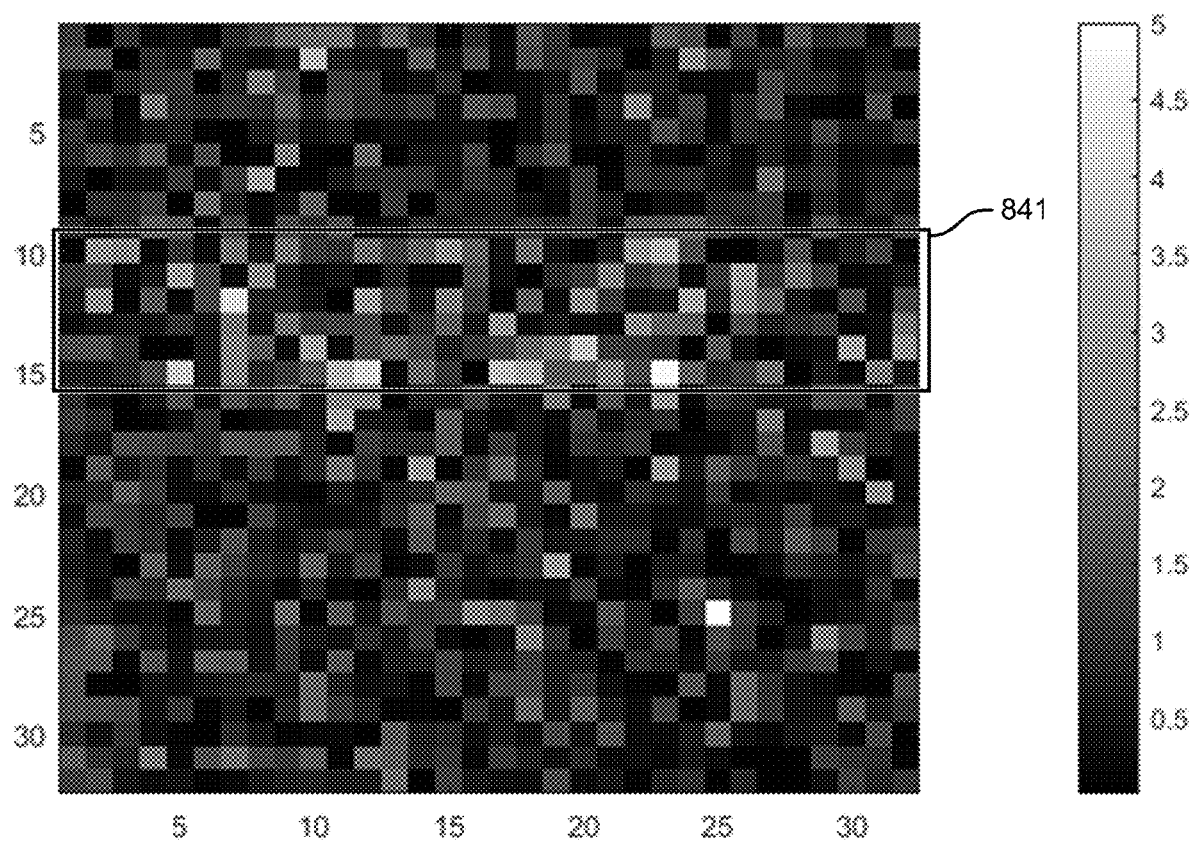
FIG. 8 illustrates an example embodiment of revised anomaly scores.

FIG. 8 illustrates an example embodiment of revised anomaly scores. In FIG. 8, the topology is the image-space topology, and thus the image in FIG. 8 may also be used as an anomaly-score image. As an anomaly-score image, FIG. 8 would be a normalized anomaly-score image $I=|\varepsilon|/\sigma_\varepsilon$ (e.g., the absolute value of the anomaly scores divided by the anomaly-score standard deviation or the revised anomaly scores). Also, the revised anomaly scores show that the image includes a diffraction region 841 where the revised anomaly scores are higher than the revised anomaly scores in the rest of the image. Additionally, FIG. 8 has a single pixel anomaly at pixel (25,25) that has a normalized score of 5 (5 standard deviations from the mean).

Furthermore, an anomaly-score image (after normalization) can be conceptualized as having a half-normal distribution with σ=1. Note the half-normal distribution is the distribution one would obtain from taking the absolute value of a normally distributed, zero-mean, random variable. The expected value (expected mean) of a unit σ half-normal random variable is $$\sqrt{\frac{2}{\pi}} = 0.7979.$$

And the expected median is $\sqrt{2}\mathrm{erf}^{-1}(\frac{1}{2})=0.6745$.

As an anomaly-score image, FIG. 8 has a median value of 0.7287. This is slightly higher than the expected median of E[median(I)]=0.6745. The increase in the median value may be an indication that the image contains some significant outlying artifacts, such as the diffraction pattern shown in rows 10 through 15 in the diffraction region 841.

In block B710, some embodiments of the detection device renormalize the anomaly scores in the image I by dividing by the expected median so that the renormalized expected median is 1.

Figure 9:
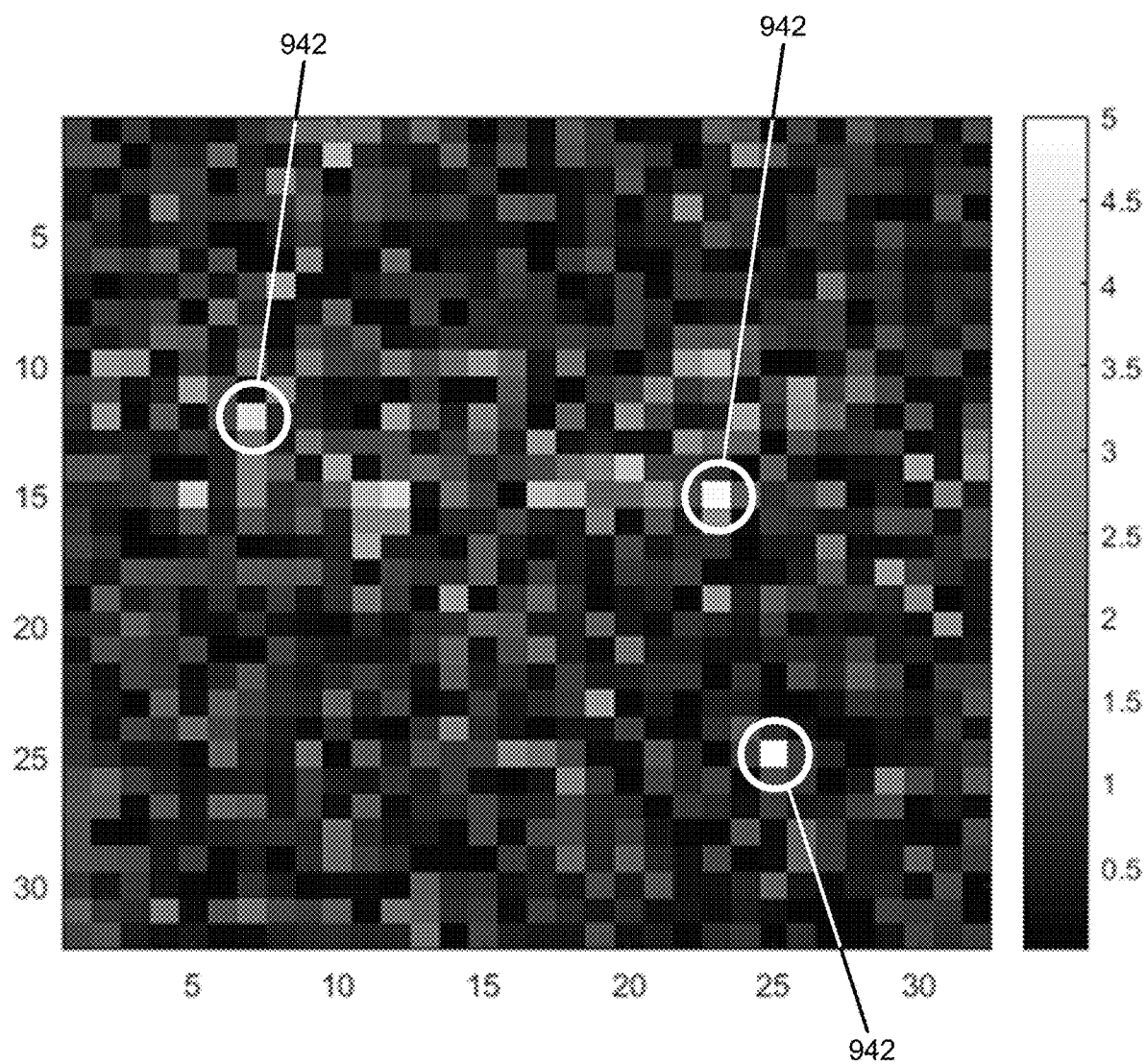
FIG. 9 highlights outliers in the revised anomaly scores that are shown in FIG. 8.

Next, in block B720, the detection device identifies outlier scores in the revised anomaly scores. For example, in some embodiments where the respective revised anomaly score of each pixel can be described by $|\varepsilon|/\sigma_\varepsilon$, where $\varepsilon$ is the raw anomaly score of the pixel, and where the variation $\sigma_\varepsilon$ is the standard deviation of the pixel, then any revised anomaly score greater than 4 (e.g., 4 standard deviations) is identified as an outlier. FIG. 9 highlights outliers 942 in the revised anomaly scores that are shown in FIG. 8.

The flow then moves to block B730, where any identified outlier scores are replaced with expected inlier scores. For example, in some embodiments, the expected inlier scores are $\sqrt{2/\pi}$. Also for example, FIG. 10 shows the revised anomaly scores that are shown in FIG. 8 after the outliers 942 shown in FIG. 9 have been replaced with inliers 1043.

The flow then proceeds to block B740, where the detection device smooths the outlier-removed revised anomaly scores. Some embodiments of the detection device use a smoothing kernel, such as a Gaussian kernel. For example, some embodiments of the detection device use a Gaussian smoothing kernel where the radius of the Gaussian filter is larger than a typical anomaly size but smaller than the typical diffraction pattern manifestation.

Figure 10:
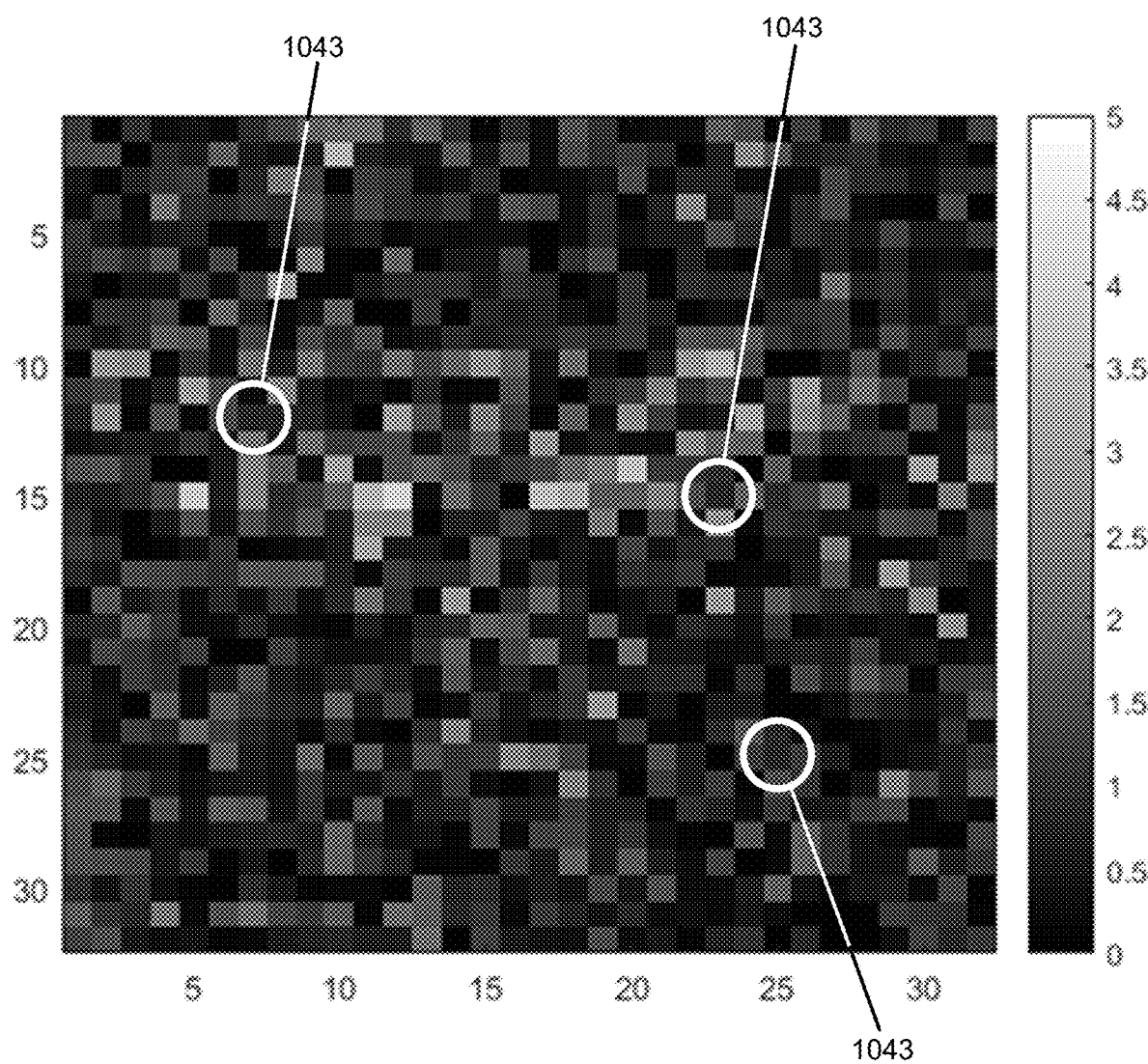
FIG. 10 shows the revised anomaly scores that are shown in FIG. 8 after the outliers shown in FIG. 9 have been replaced with inliers.
Figure 11:
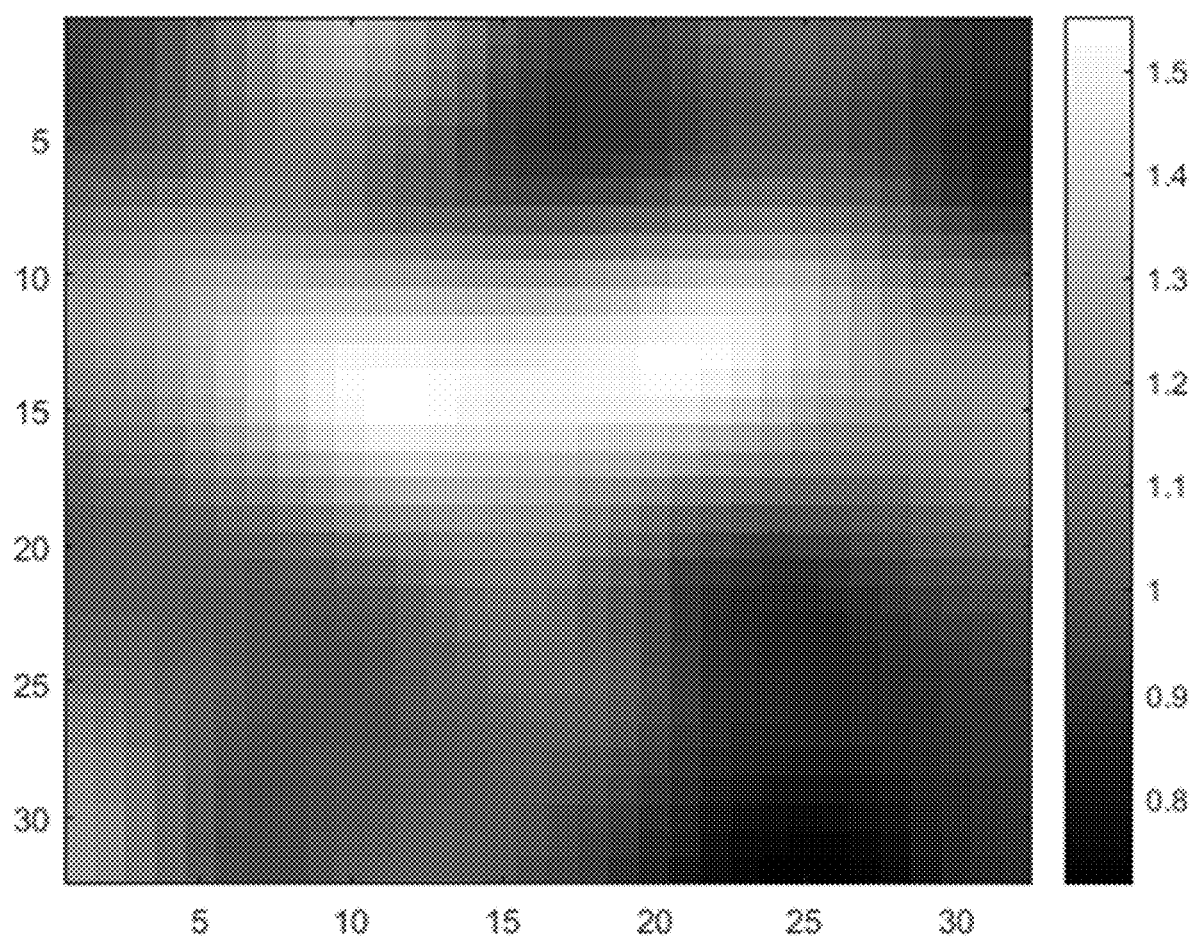
FIG. 11 shows the smoothed, outlier-removed, revised anomaly scores from FIG. 10.

Also for example, FIG. 11 shows the smoothed, outlier-removed, revised anomaly scores from FIG. 10. FIG. 11 was generated from FIG. 10 by smoothing FIG. 10 with a Gaussian filter of radius 3 and then scaling the smoothed scores by the expected value of an error $\sqrt{2/\pi}$ so that values above 1 indicate higher than normal anomaly score regions and values below 1 indicate lower than normal anomaly score regions. Note that, in FIG. 11, rows 10 to 15 show a brighter band, which may indicate that there is some abnormal shift in the anomaly scores (potentially due to diffraction, for example).

Next, in block B750, the detection device generates one or more adjustment factors based on the smoothed, outlier-removed, revised anomaly scores. For example, the detection device may generate one adjustment factor for all of the revised anomaly scores, the detection device may generate one adjustment factor for all of the revised anomaly scores in a region of the topology, or the detection device may generate a respective adjustment factor for each of one or more of the revised anomaly scores in the topology. Some embodiments of the detection device apply an adjustment to a revised anomaly score only if the revised anomaly score is determined to be higher than normal (e.g., as indicated by an anomaly-score variation), and thus do not adjust revised anomaly scores that are lower than normal. Also, some embodiments handle the target anomaly distribution as a truncated Gaussian distribution, for example in contrast to a half-normal distribution. Some embodiments adjust all of the revised anomaly scores based on their local means as determined on the topology. And some embodiments adjust the revised anomaly scores up to a limit or adjust the scores more conservatively (e.g., if the calculated adjustment factors range from 0.5 to 1.5, the actual adjustment could be the square root of the adjustment factor).

For example, some embodiments of the detection device use a threshold of 1.0 to generate the adjustment factors. In such embodiments, the detection device sets all of the smoothed, outlier-removed, revised anomaly scores that are at or below 1.0 to 1.0, and the detection device does not adjust the smoothed, outlier-removed, revised anomaly scores that are greater than 1.0. The detection device then uses the thresholded, smoothed, outlier-removed, revised anomaly scores as the adjustment factors. Thus, each revised anomaly score may have a respective adjustment factor.

Figure 12:
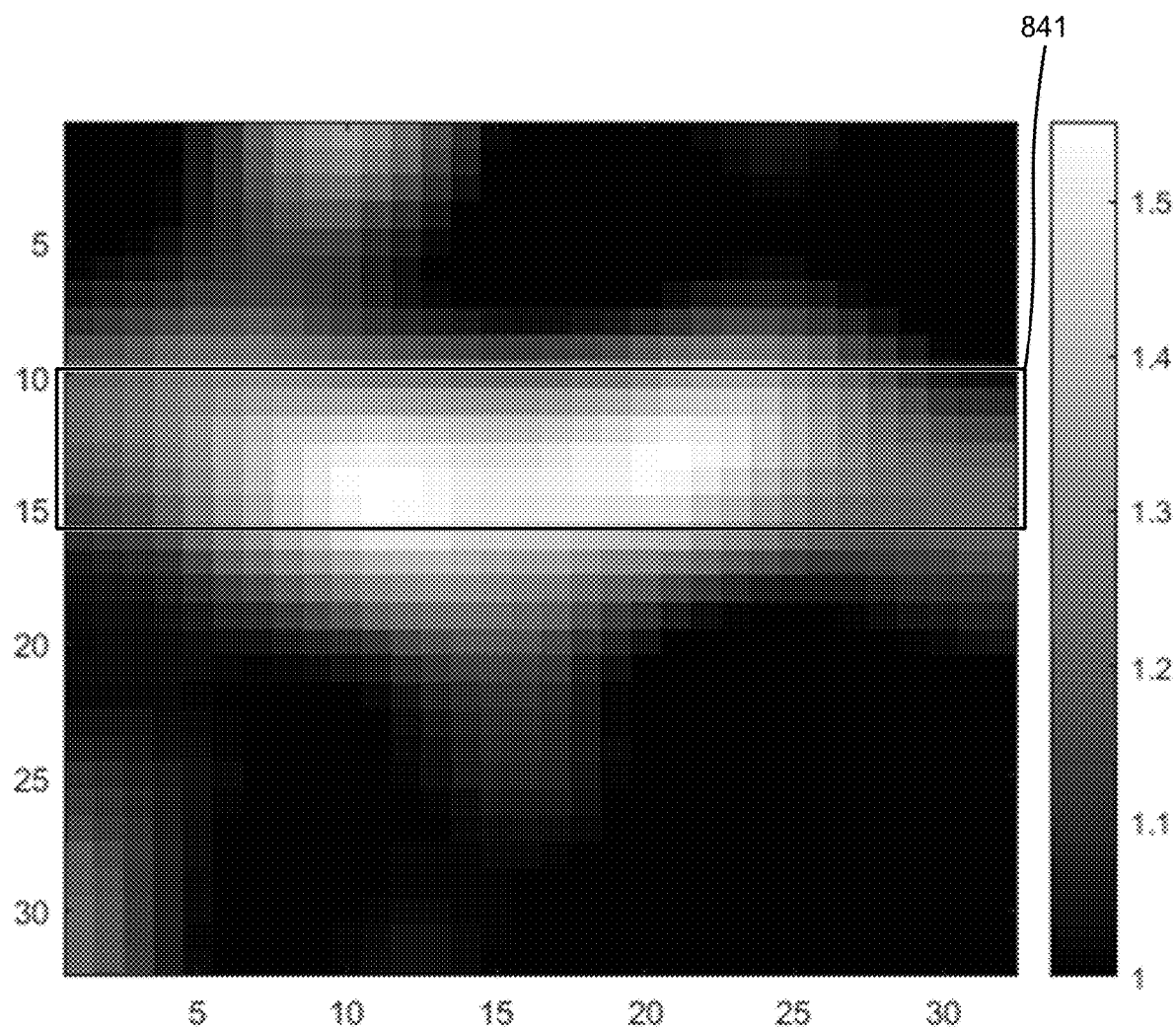
FIG. 12 illustrates an example embodiment of adjustment factors that were generated by applying a threshold of 1.0 to the smoothed, outlier-removed, revised anomaly scores from FIG. 11.

For example, the values in FIG. 11 could be used as adjustment factors of the corresponding pixels. However, in FIG. 11, some regions appear to have lower than expected variations. To avoid modifying the anomaly scores in these regions, some embodiments of the detection device set all values below 1 to be 1. FIG. 12 illustrates an example embodiment of adjustment factors that were generated by setting all of the anomaly scores of the smoothed, outlier-removed, revised anomaly scores from FIG. 11 that are below 1 to 1 (Note that FIG. 12 has areas where the adjustment factor is 1.0). In embodiments in which an adjustment factor of 1.0 applies no adjustment, these areas do not apply any adjustment. Also, note that FIG. 12 has adjustments mostly for the scores in the diffraction region 841 (rows 10 to 15).

The flow then moves to block B760, where the detection device outputs or stores the adjustment factors, for example in a map that matches the topology (e.g., as shown in FIG. 12). The flow then ends in block B770.

Figure 13:
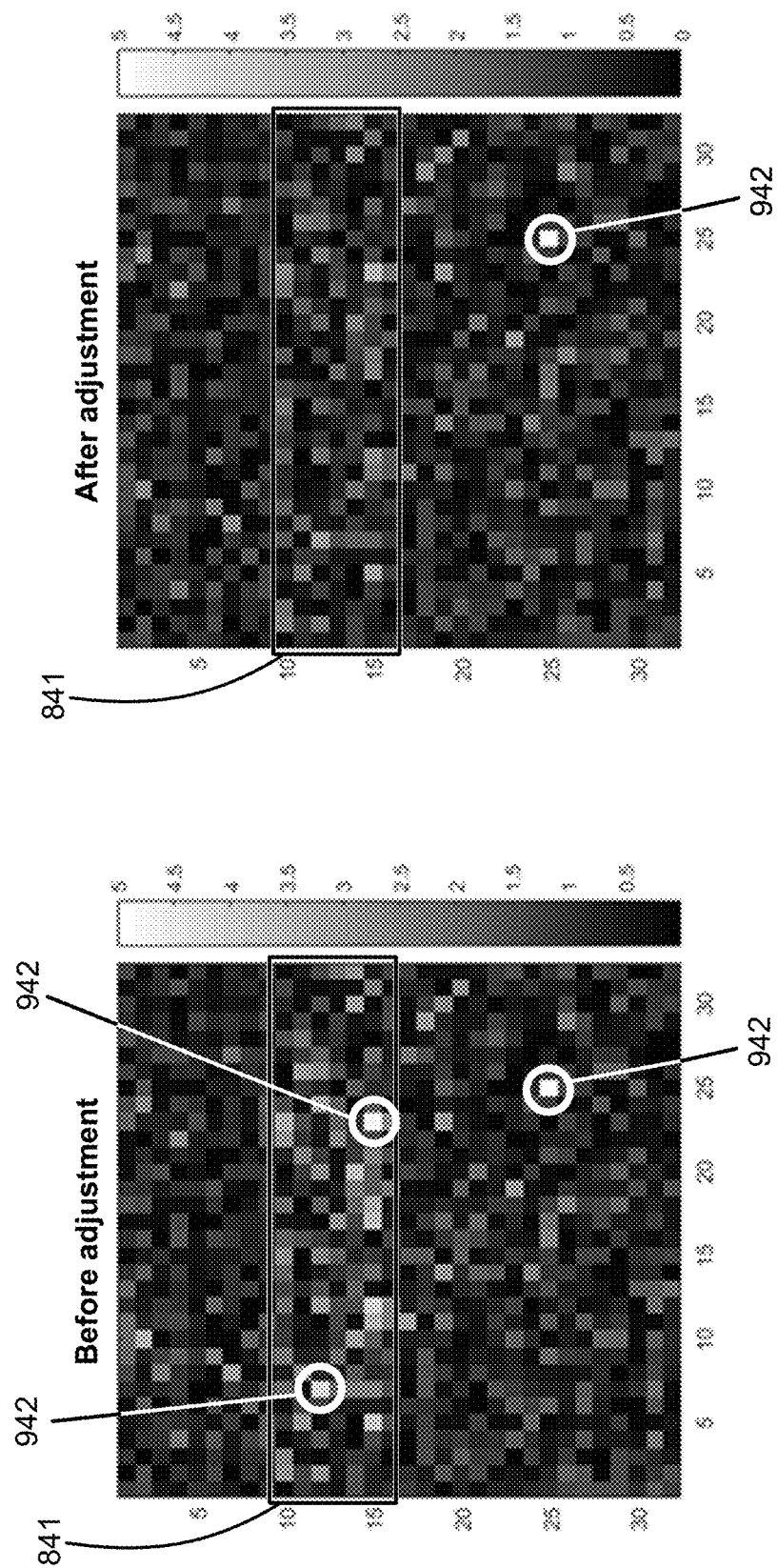
FIG. 13 illustrates the revised anomaly scores from FIG. 8 before normalization and illustrates the revised anomaly scores from FIG. 8 after normalization using the adjustment factors from FIG. 12.

As noted in block B660, the adjustment factors may be used to adjust (e.g., locally normalize) anomaly scores (e.g., revised anomaly scores) on the topology. For example, FIG. 13 illustrates the revised anomaly scores from FIG. 8 before adjustment and illustrates the revised anomaly scores from FIG. 8 after adjustment using the adjustment factors in FIG. 12. In this example, the revised anomaly scores before adjustment in FIG. 8 were adjusted by dividing the revised anomaly scores by their respective adjustment factors in FIG. 12. Note that, before adjustment, the revised anomaly scores included three outliers 942, which may indicate defects. However, two of the outliers 942 are in the diffraction region 841, where the revised anomaly scores are higher than the revised anomaly scores in the rest of the image. After adjustment, the two outliers 942 in the diffraction region 841 are gone. Also, the revised anomaly scores in the diffraction region 841 now appear to have a similar distribution as the rest of the revised anomaly scores.

Figure 14:
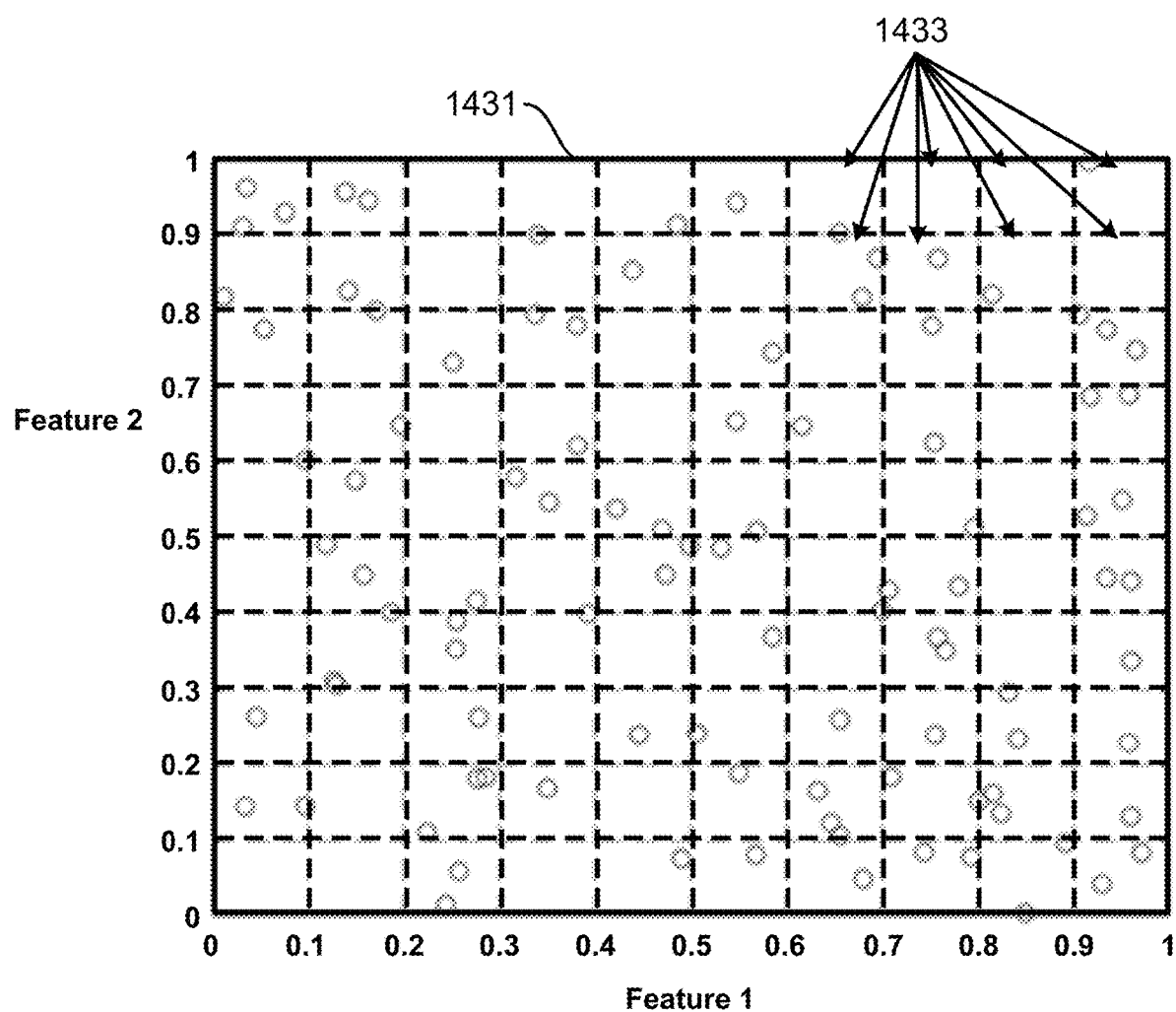
FIG. 14 illustrates an example embodiment of a topology that includes bins.

FIG. 14 illustrates an example embodiment of a topology 1431 that includes bins 1433. The topology 1431 is a multi-dimensional topology. Binning may reduce the computational expense of topological normalization. Also, because the binning can be performed on each feature independently, binning does not require the definition of a similarity or dis-similarity measure to span multiple dimensions, but rather to span only the individual dimensions. In some embodiments, bins are spaced in each feature dimension to equalize sample sizes across the marginal distributions. However, the number of bins may grow exponentially with the number of dimensions. Thus, binning may not be ideal for some high-dimensional topologies. However, dimensionality-reduction techniques (e.g., spectral embedding, principle component analysis) may be used to reduce the number of dimensions before binning.

A detection device may make statistical measures based on the samples in each bin 1433. And priors on the statistics may also be used to handle cases where bins 1433 have a small number of samples. Also, the bins 1433 themselves do preserve part of the topology because each bin 1433 has neighboring bins 1433. Thus, bins 1433 may be further locally smoothed or averaged by incorporating data from the neighboring bins 1433. Some embodiments of the detection device weigh the neighboring bins 1433 differently based on their distance from the current bin 1433 where the statistics are being estimated. Additionally, once each bin 1433 has an estimate for the statistic (e.g., anomaly-score mean), then these values may be estimated more continuously across the feature space using interpolation techniques, such as bi-linear or bi-cubic interpolation.

Figure 15:
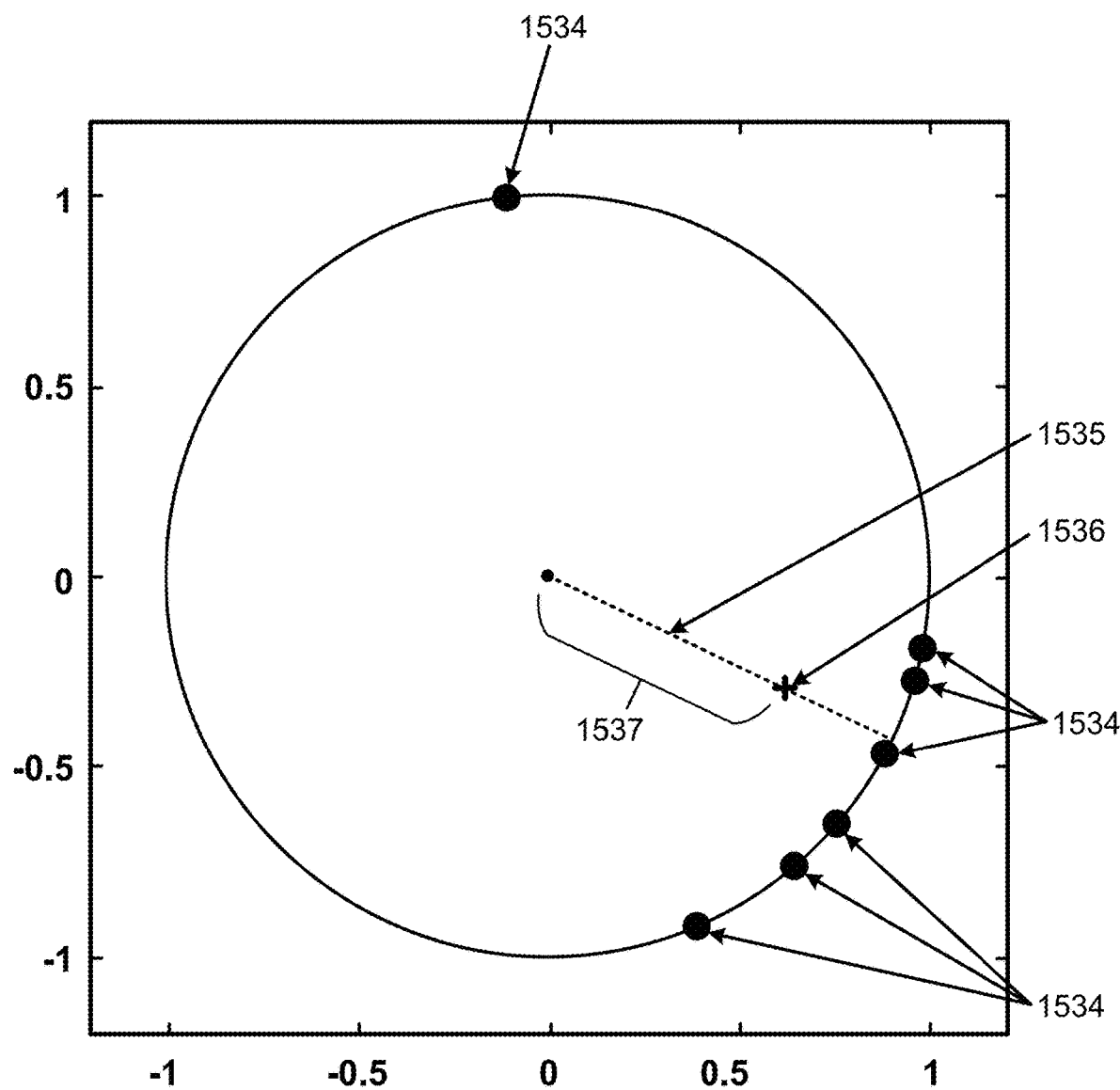
FIG. 15 illustrates an example embodiment of a topology that is based on each pixel's gradient magnitude and gradient angle.

FIG. 15 illustrates an example embodiment a topology that is based on each pixel's gradient magnitude and gradient angle. The pixel-gradient angles of a set of angles $\{\theta_1, \theta_2, \ldots, \theta_N\}$ may be defined in two dimensions on a unit circle. FIG. 15 shows a unit circle on which seven angles 1534 are defined. The angles are 96, 293, 310, 319, 332, 344, and 349 degrees, and the angles are plotted in two dimensions as $(\cos(\theta_i), \sin(\theta_i))$ on a unit circle.

Some embodiments of the detection device calculate a mean pixel-gradient angle at a pixel location (e.g., pixel P in FIG. 3) in a set of training images, for example when calculating an anomaly-score variation for a pixel location in block B240. To find the mean pixel-gradient angle, some embodiments of the detection device average the locations of the points on the unit circle and find the mean pixel-gradient angle to be on or inside the unit circle. For example, if the detection device was averaging the seven angles 1534, then the mean pixel-gradient angle 1535 would be 333 degrees. The "+" marker 1536 illustrates the average of the locations of the points, in x and y coordinates, on the unit circle where the seven angles 1534 intersect the unit circles. The detection device may find the mean pixel-gradient angle 1535 in the two-dimensional space using the arc tangent function on the x-y coordinates of the "+" marker 1535.

By converting the angle-averaging problem to a two-dimensional problem, the detection device is able to account for the cyclic nature of the angles. For example, the arithmetic average of angles of 1 degree and 359 degrees would be 180. However, on the unit circle, these angles are separated by only two degrees (359 degrees is also −1 degree). Using the aforementioned two-dimensional averaging, the average of 359 degrees and 1 degree is 0 degrees. Accordingly, this two-dimensional approach to angle averaging may be more robust to outliers.

In addition to an angle, the above angle averaging also provides another piece of information on the collection of angles being averaged: a radius. The mean two-dimensional value can be described as a combination of an angle and a radius, and the distance of the radius from the unit circle may signify the variation of the samples (e.g., the angles). Thus, the radius 1537 to the "+" marker 1536 may contain relevant information about the confidence in the generated mean pixel-gradient angle. If the radius is close to 1 (a small distance from the unit circle), then the generated mean pixel-gradient angle would have a high confidence. Alternatively, if the radius was close to 0 (a large distance from the unit circle and a small distance to the center of the unit circle), then the generated mean pixel-gradient angle would have a low confidence. The mean-pixel-gradient-angle confidence may provide an additional feature in a higher-dimensional topology, and the mean-pixel-gradient-angle confidence may also be binned.

For example, in one embodiment, a plurality of aligned training images, each having 1024×1024 pixels, was acquired. Each pixel's gradient magnitude and gradient angle was estimated using a Sharr gradient kernel. For each pixel location across the training images, the median gradient magnitude was found across the training images, and the median gradient magnitude was binned into one of 10 bins. Also, in an example embodiment that performs angle binning in addition to median-gradient-magnitude binning, the mean gradient angles of the pixel locations were binned into 36 bins (10 degrees per bin). Note that, in the dimension of angle, the topology is cyclic in the sense that the last bin is a neighbor of the first bin. Thus, the topology can have three dimensions, where all the bins lie on the surface of a cylinder (e.g., the gradient-angle is a radial position on the cylinder surface and the gradient-magnitude is a position along the length of the cylinder). Additional smoothing, averaging, or interpolation may be done on this cylindrical surface.

Figure 16:
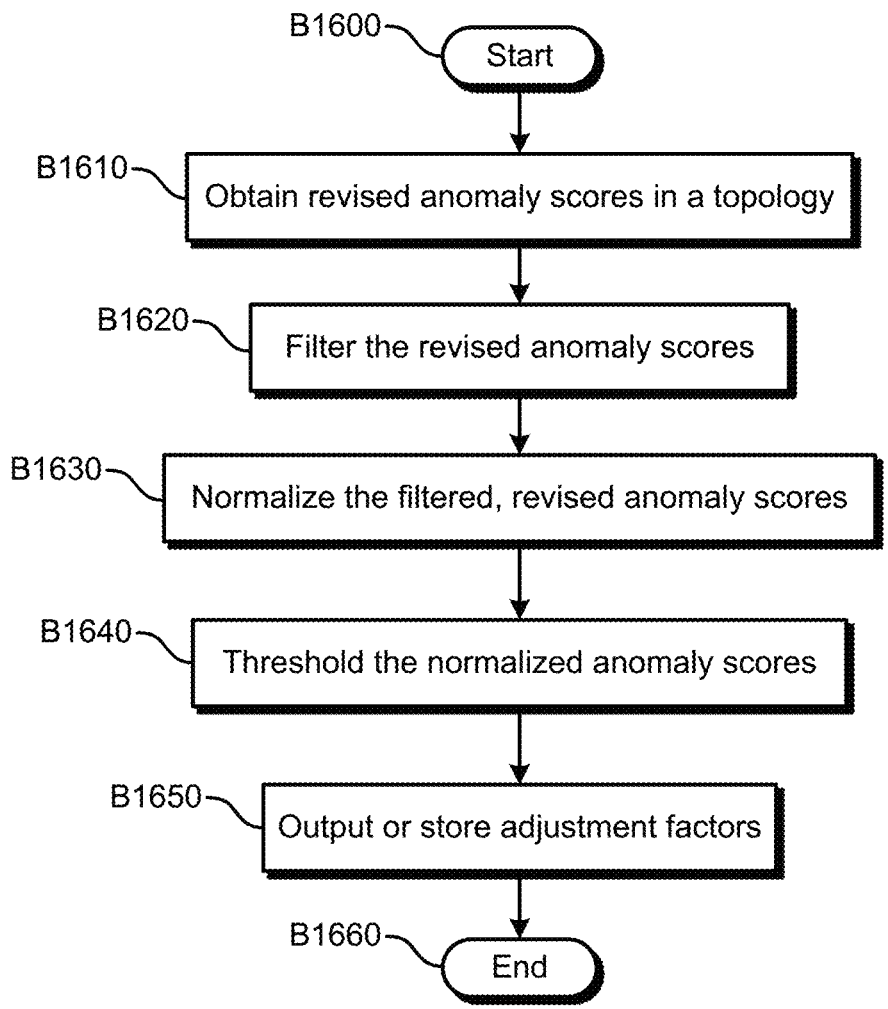
FIG. 16 illustrates an example embodiment of an operational flow for generating adjustment factors.

FIG. 16 illustrates an example embodiment of an operational flow for generating adjustment factors. The flow starts in block B1600 and moves to block B1610, where a detection device obtains revised anomaly scores in a topology. For example, the revised anomaly scores may be generated as described in block B640.

Figure 17:
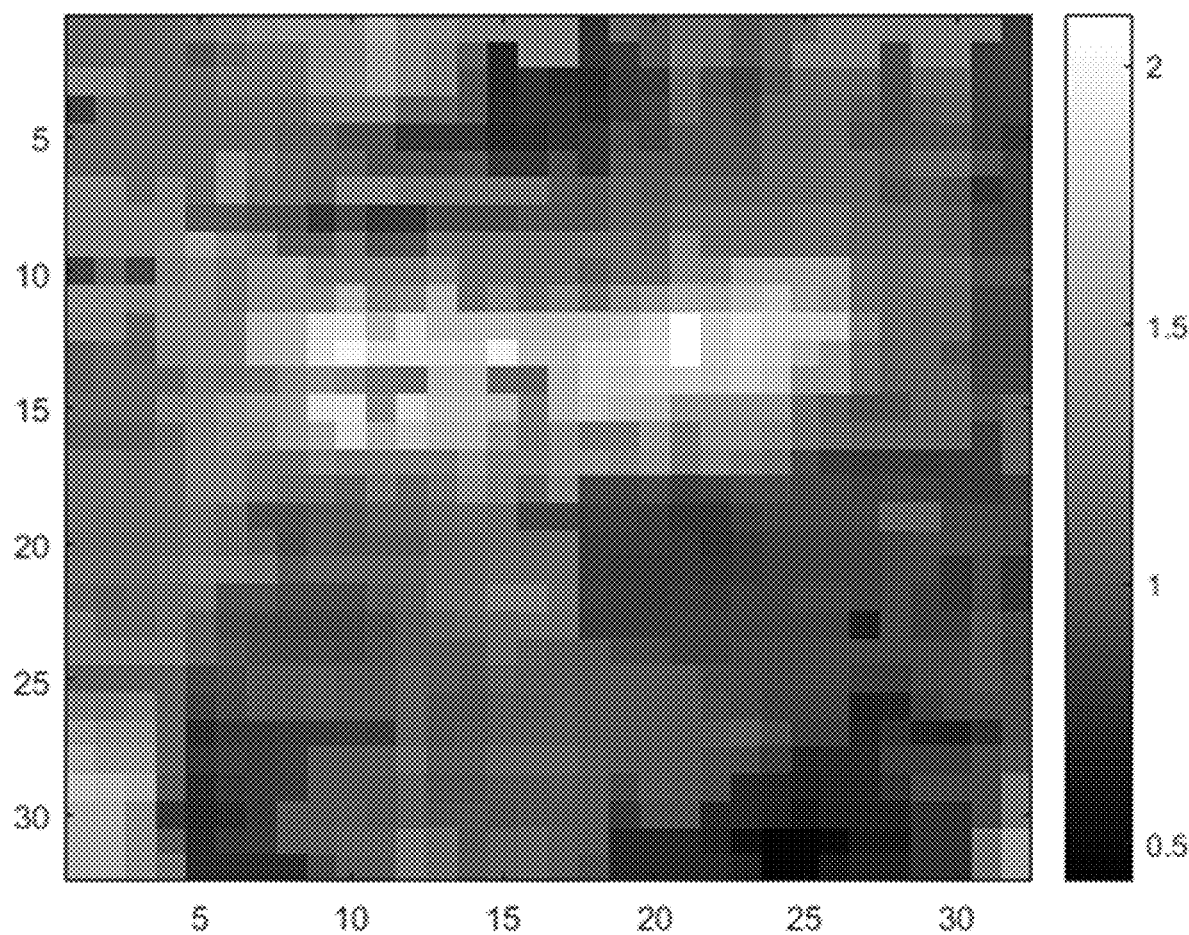
FIG. 17 illustrates an example embodiment of normalized, filtered, revised anomaly scores.

Next, in block B1620, the detection device filters the revised anomaly scores. For example, some embodiments of the detection device use a median filter (e.g., a two-dimensional median filter). The flow then moves to block B1630, where the detection device normalizes the filtered, revised anomaly scores. For example, FIG. 17 illustrates an example embodiment of normalized, filtered, revised anomaly scores. The normalized, filtered, revised anomaly scores were generated by using a two-dimensional median filter of 7×7 pixels on the revised anomaly scores in FIG. 8 and then normalizing the filtered, revised anomaly scores by the expected median value of a normalized anomaly score.

Figure 18:
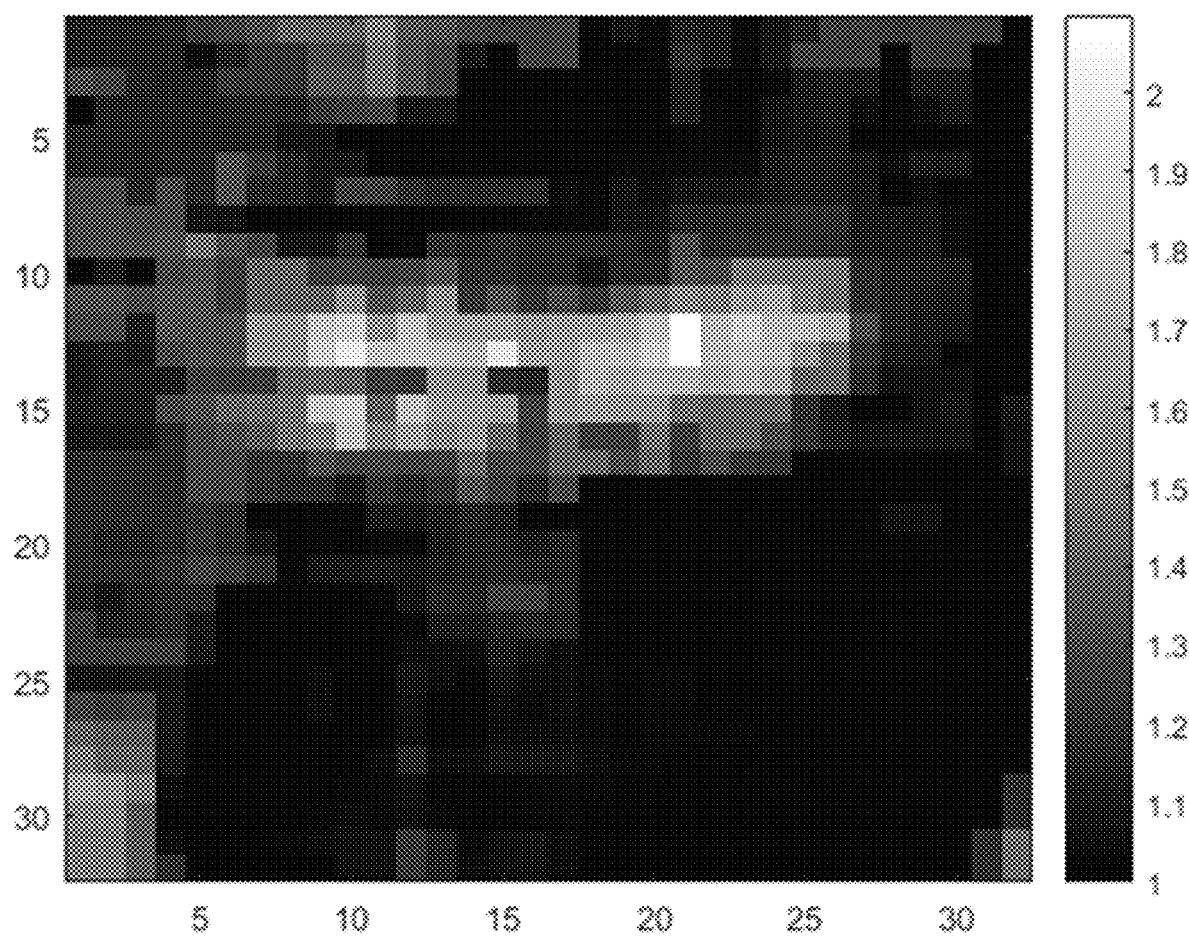
FIG. 18 illustrates an example embodiment of thresholded, normalized, filtered, revised anomaly scores.

The flow then proceeds to block B1640, where the detection device thresholds the normalized, filtered, revised anomaly scores. For example, some embodiments of the detection device set all of the normalized, filtered, revised anomaly scores that are less than 1 to 1. FIG. 18 illustrates an example embodiment of thresholded, normalized, filtered, revised anomaly scores. The thresholded, normalized, filtered, revised anomaly scores in FIG. 18 were generated by setting all of the normalized, filtered, revised anomaly scores in FIG. 17 that are less than 1 to 1.

Next, in block B1650, the detection device then stores or outputs the thresholded, normalized, filtered, revised anomaly scores as the adjustment factors. The flown then ends in block B1660.

Figure 19:
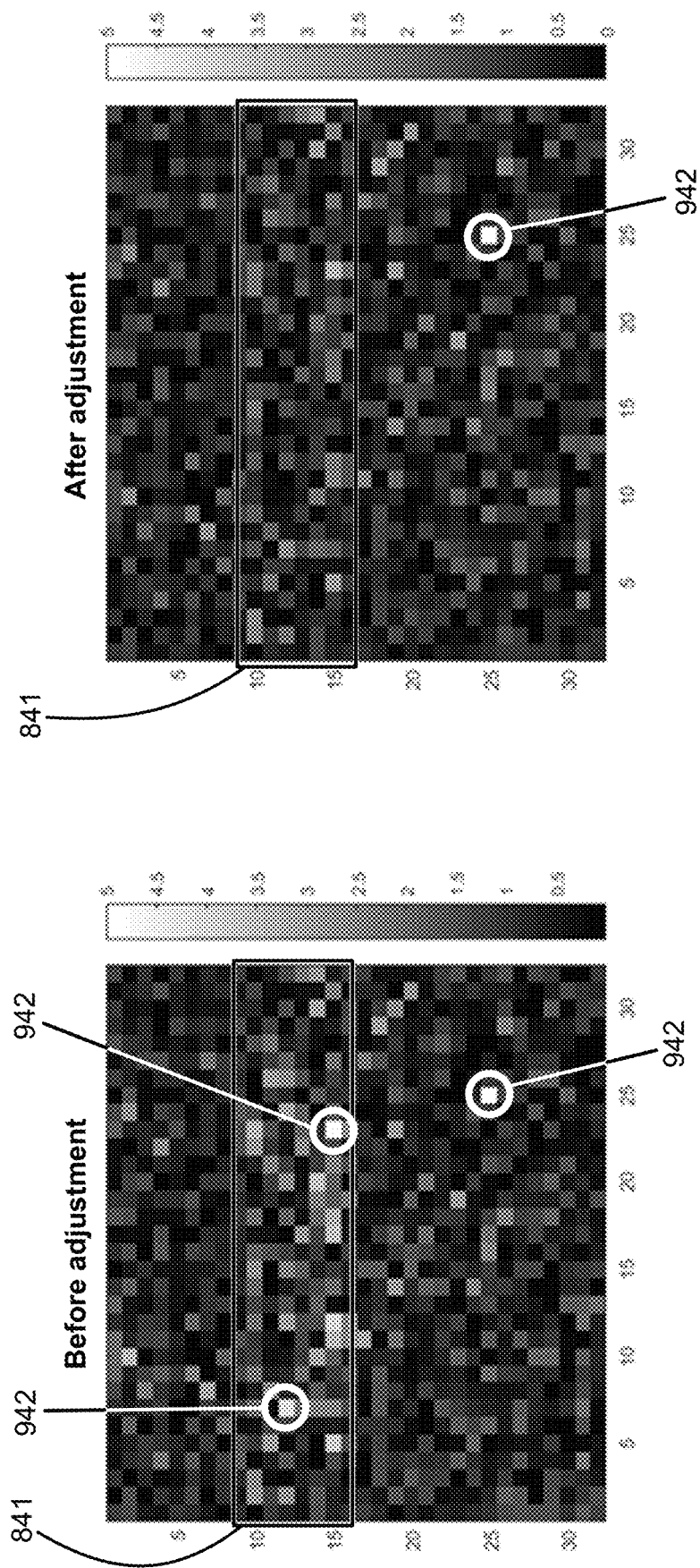
FIG. 19 illustrates the revised anomaly scores from FIG. 8 before adjustment and illustrates the revised anomaly scores from FIG. 8 after adjustment using the adjustment factors from FIG. 18.

For example, FIG. 19 illustrates the revised anomaly scores from FIG. 8 before adjustment and illustrates the revised anomaly scores from FIG. 8 after adjustment using the adjustment factors in FIG. 18. In this example, the revised anomaly scores before adjustment in FIG. 8 were adjusted by dividing the revised anomaly scores by their respective adjustment factors from FIG. 18. Note that, before adjustment in FIG. 8, the revised anomaly scores include three outliers 942, which may indicate defects. Two of the outliers 942 in FIG. 8 are in the diffraction region 841, where the revised anomaly scores are higher than the revised anomaly scores in the rest of FIG. 8. The adjustment reduced the revised anomaly scores of these two outliers 942 in the diffraction region 841 from 4.162 to 2.961 and from 4.786 to 3.422, but the adjustment did not change the revised anomaly score (which was 5) of the pixel at (25,25). Thus, the adjusted, revised anomaly scores in FIG. 19 include only the outlier at (25,25).

Figure 20:
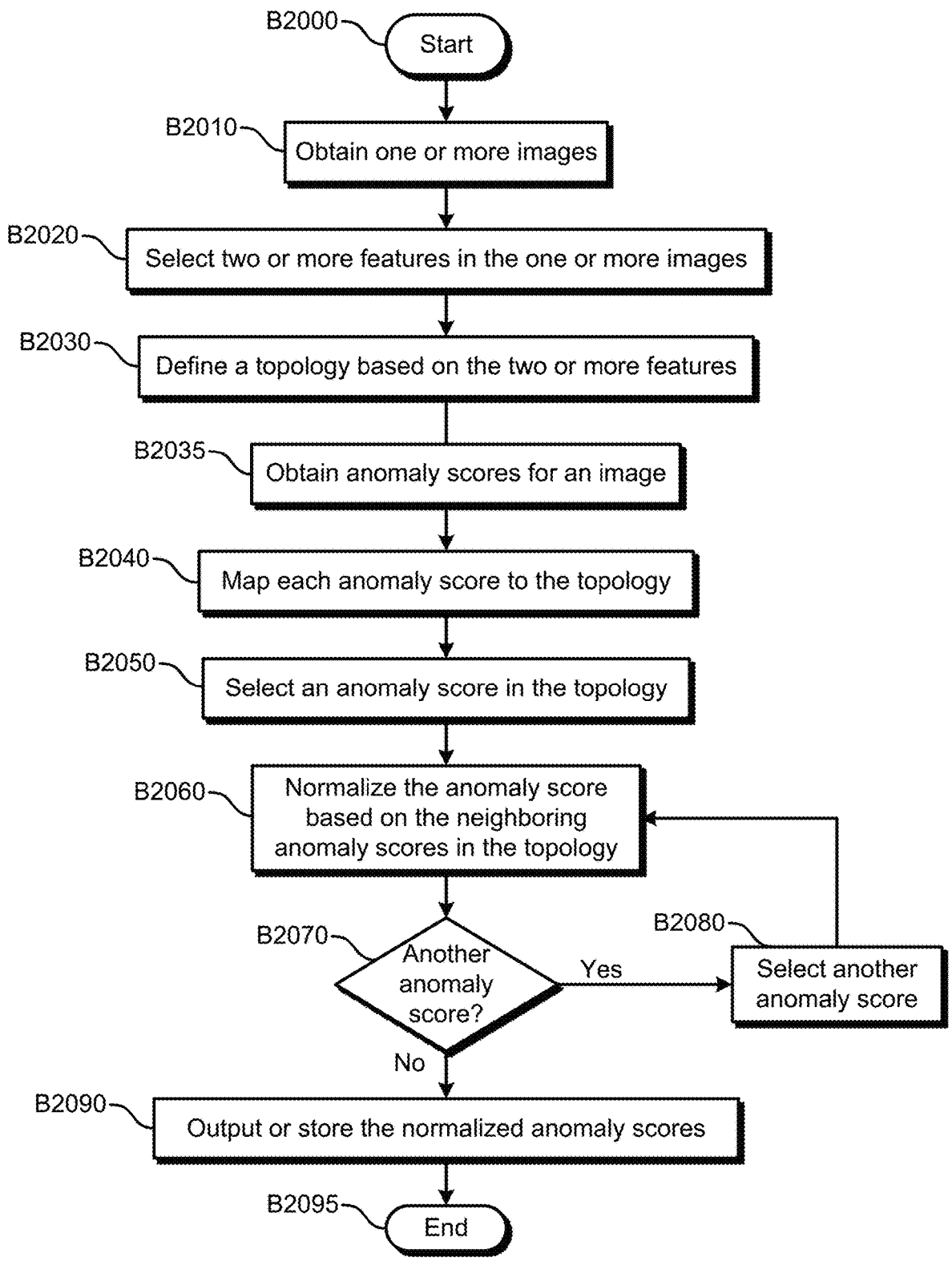
FIG. 20 illustrates an example embodiment of an operational flow for generating normalized anomaly scores.

FIG. 20 illustrates an example embodiment of an operational flow for generating normalized anomaly scores. The operational flow starts in block B2000 and then moves to block B2010, where a detection device obtains one or more images (e.g., training images). Next, in block B2020, the detection device selects two or more features in the one or more images. The flow then proceeds to block B2030, where the detection device defines a topology based on the two or more features. Also, the detection device generates a topology mapping from the topology to the image space. Additionally, some embodiments of the detection device define topologies that are based on only a single feature (one-dimensional topologies).

In block B2035 anomaly scores for an image are obtained. This image may be different from the one or more images that were obtained in block B2010, such as a test image. The detection device may generate a respective anomaly score for each pixel (or other detection area) in the image. Also, the anomaly scores may be arranged in an anomaly-score image (e.g., as shown in FIG. 8). Then, in block B2040, the detection device maps each anomaly score to the topology using the topology mapping. Examples of some topology mappings are illustrated in FIG. 4 (two-dimensional feature space mapping), FIGS. 5A and 5B (one-dimensional feature space mapping), and FIG. 14 (a binned two-dimensional feature space mapping). Also, FIGS. 8-13 illustrate an example of an image coordinate topology where the topology mapping is an identity mapping of the coordinates.

Next, in block B2050, the detection device selects an anomaly score in the topology, for example by selecting a pixel in the topology and the pixel's corresponding anomaly score. The flow then moves to block B2060, where the detection device normalizes the anomaly score based on the neighboring anomaly scores in the topology. For example, the detection device may generate an adjustment factor as described in FIG. 7 and adjust the anomaly score based on the adjustment factor. If the detection device performs multiple iterations of block B2060, the detection device may not generate adjustment factors in every iteration.

The flow then proceeds to block B2070, where the detection device determines if another anomaly score is to be normalized. If detection device determines that another anomaly score is to be normalized (B2070=Yes), then the flow moves to block B2080, where the detection device selects another anomaly score in the topology, and then the flow returns to block B2060. If detection device determines that another anomaly score is not to be normalized (B2070=No), then the flow moves to block B2090, where the detection device stores or outputs the normalized anomaly scores for the image from block B2035. The detection device may also perform anomaly detection on the normalized anomaly scores. The flow then ends in block B2095.

Additionally, some embodiments of the detection device perform blocks B2020 to B2030 multiple times, thereby generating multiple topologies. And some embodiments of the detection device repeat blocks B2035 to B2090 for the multiple topologies. These embodiments may use the normalized anomaly scores from one topology as the inputs to the normalization in a different topology. Thus, the anomaly scores that are used in block B2090 may have been normalized in multiple topologies.

Figure 21:
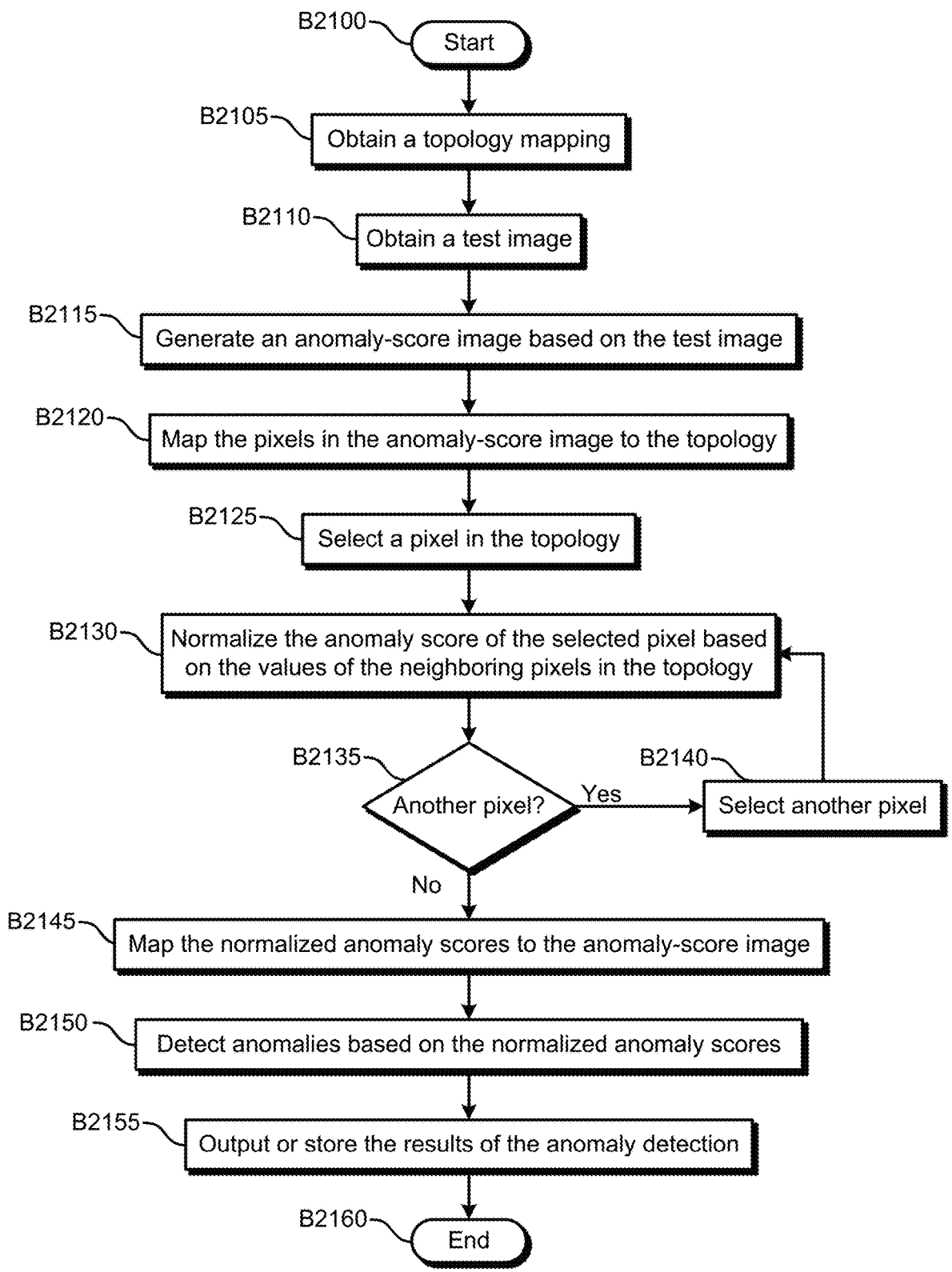
FIG. 21 illustrates an example embodiment of an operational flow for anomaly detection.

FIG. 21 illustrates an example embodiment of an operational flow for anomaly detection. The operational flow in FIG. 21 starts in block B2100 and then moves to block B2105, where a detection device obtains a topology mapping between an image space and a topology (e.g., retrieves a topology mapping from a storage medium). Next, in block B2110, the detection device obtains (e.g., receives, retrieves, captures) a test image. Then, in block B2115, the detection device generates an anomaly-score image based on the test image. In the anomaly-score image, each pixel's value is a respective anomaly score.

Next, in block B2120, the detection device maps the pixels (and their respective anomaly scores) in the anomaly-score image to the topology using the topology mapping. Then, in block B2125, the detection device selects a pixel in the topology, and, in block B2130, the detection device normalizes the anomaly score of the selected pixel based on the anomaly scores of the neighboring pixels in the topology. For example, the detection device may generate an adjustment factor as described in FIG. 7 and adjust the anomaly score of the selected pixel based on the adjustment factor. If the detection device performs multiple iterations of block B2130, the detection device may not generate adjustment factors in every iteration.

The flow then moves to block B2135, where the detection device determines if another pixel is to be selected. If the detection device determines that another pixel is to be selected (B2135=Yes), then the flow moves to block B2140, where the detection device selects another pixel, and then the flow returns to block B2130. However, if the detection device determines that another pixel is not to be selected (B2135=No), for example when every pixel of interest has been normalized, then the flow moves to block B2145.

In block B2145, the detection device maps the normalized anomaly scores to the anomaly-score image using the mapping from the image space to the topology, thereby generating an anomaly-score image in which the pixels' values are the normalized anomaly scores. Next, in block B2150, the detection device performs anomaly detection based on the normalized anomaly scores in the anomaly-score image that was generated in block B2145. Some embodiments omit block B2145 and perform the anomaly detection based on the normalized anomaly scores in the topology. The flow then moves to block B2155, where the detection device outputs or stores the results of the anomaly detection. And the flow ends in block B2160.

Additionally, some embodiments of the detection device obtain multiple topologies and repeat blocks B2120 to B2140 or B2145 for the multiple topologies. These embodiments may use the anomaly scores that were normalized in one topology as the inputs to the normalization in a different topology. Thus, in such embodiments, the pixels values that are used in block B2150 will have been normalized using multiple topologies.

Figure 22:
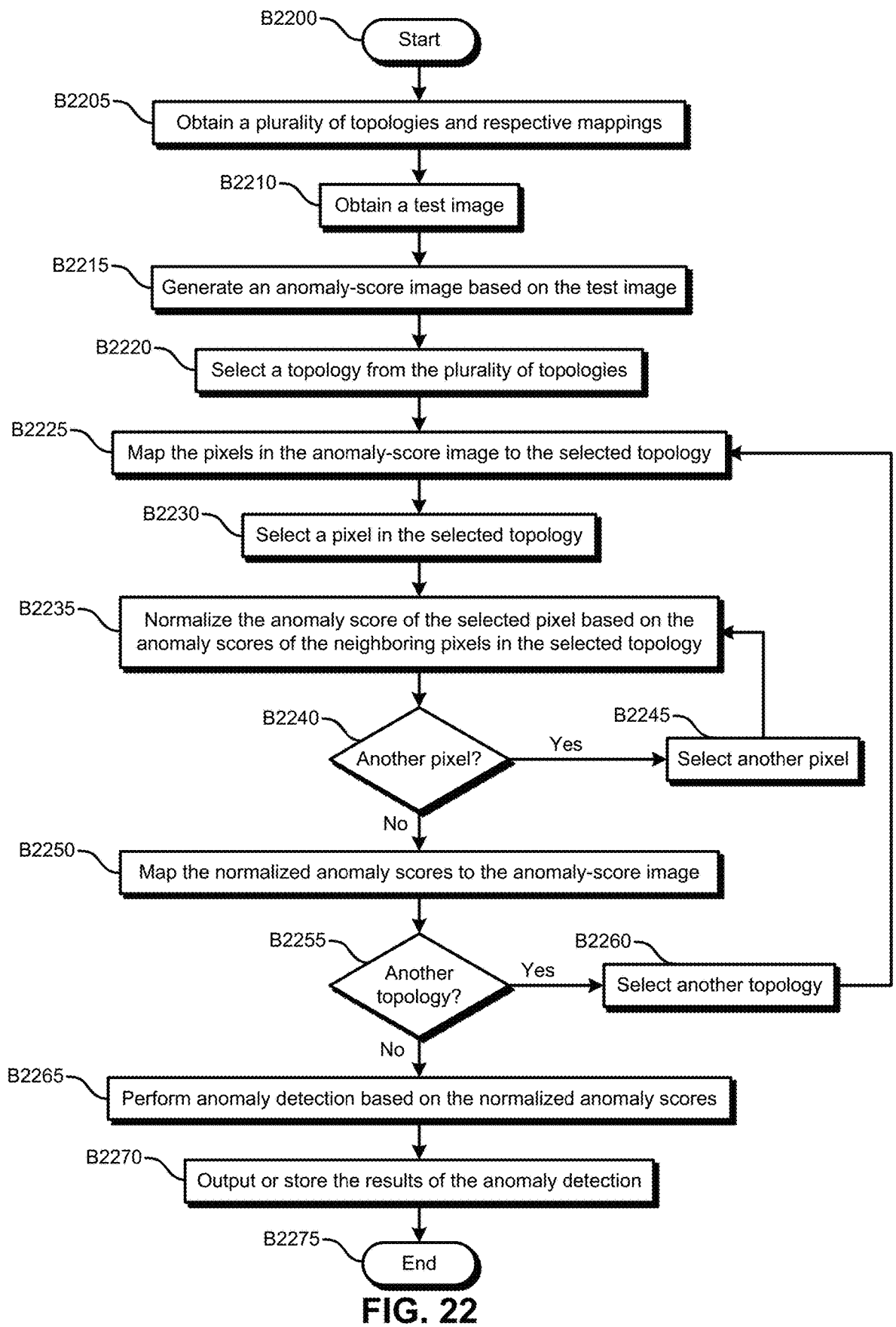
FIG. 22 illustrates an example embodiment of an operational flow for anomaly detection.

FIG. 22 illustrates an example embodiment of an operational flow for anomaly detection. The operational flow starts in block B2200 and then moves to block B2205, where a detection device obtains a plurality of topology mappings between an image space and respective topologies (e.g., retrieves the topology mappings from one or more storage media). Next, in block B2210, the detection device obtains a test image. Then, in block B2215, the detection device generates an anomaly-score image based on the test image. In the anomaly-score image, each pixel's value is a respective anomaly score. The detection device may generate the anomaly scores by performing one or more anomaly-detection operations on the test image.

The flow then moves to block B2220, where the detection device selects a topology from the plurality of topologies. Next, in block B2225, the detection device maps the pixels (and their respective anomaly scores) in the anomaly-score image to the selected topology using the respective topology mapping. Then, in block B2230, the detection device selects a pixel in the selected topology, and, in block B2235, the detection device normalizes the anomaly score of the selected pixel based on the anomaly scores of the neighboring pixels in the selected topology. The flow then moves to block B2240, where the detection device determines if another pixel is to be selected. If the detection device determines that another pixel is to be selected (B2240=Yes), for example if some pixels that have yet to be selected remain, then the flow moves to block B2245, where the detection device selects another pixel, and then the flow returns to block B2235. However, if the detection device determines that another pixel is not to be selected (B2240=No), for example when every pixel has already been selected, then the flow moves to block B2250.

In block B2250, the detection device maps the normalized anomaly scores to the anomaly-score image, thereby generating an anomaly-score image in which the pixels' values are the normalized anomaly scores. The flow then moves to block B2255, where the detection device determines if normalization is to be performed in another topology of the plurality of topologies (e.g., a topology in which normalization has not already been performed). If the detection device determines that normalization is to be performed in another topology (B2255=Yes), then the flow proceeds to block B2260, where the detection device selects another topology, and then the flow returns to block B2225. Otherwise (B2255=No), the flow moves to block B2265.

In block B2265, the detection device performs anomaly detection based on the normalized anomaly scores in the anomaly-score image that was generated in the latest iteration of block B2250. Also, the anomaly detection may be performed on the normalized anomaly scores without mapping the normalized anomaly scores to the anomaly-score image. The flow then moves to block B2270, where the detection device outputs or stores the results of the anomaly detection. And the flow ends in block B2275.

Figure 23A:
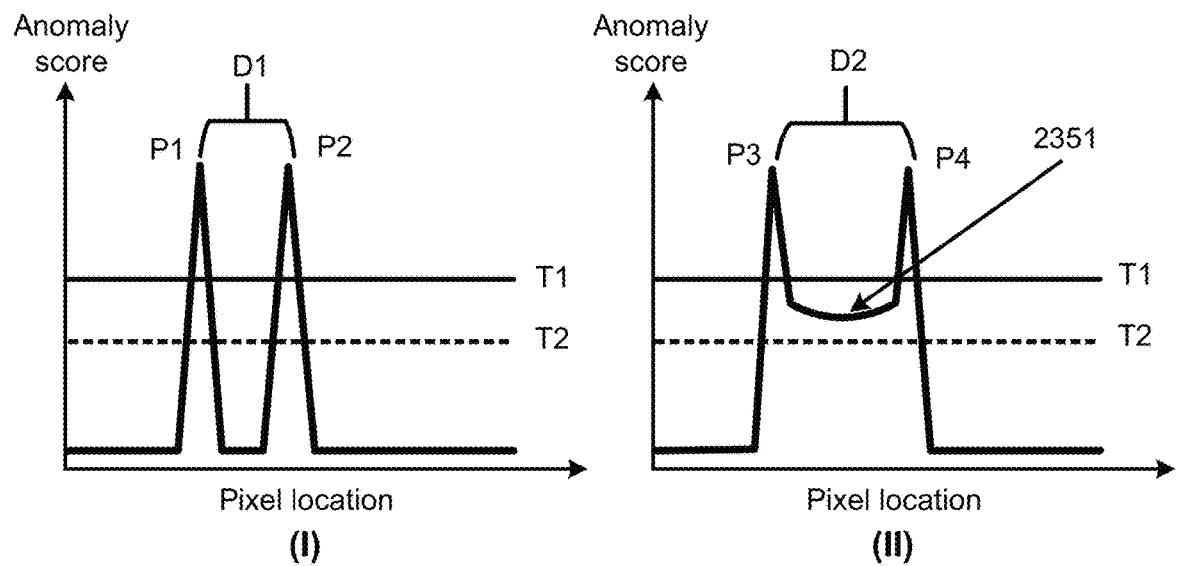
FIG. 23A illustrates example embodiments of anomaly scores.

Also, some embodiments of the one or more detection devices compensate for variations in the anomaly scores by implementing two-stage or four-stage post-processing anomaly detection that identifies both the number and the sizes of the anomaly regions by using an adaptive threshold. FIG. 23A illustrates example embodiments of anomaly scores. In graph (I), two peaks (peaks P1 and P2) in the anomaly scores exceed threshold T1 (which may be an anomaly-detection threshold). Using the distance D1 between the two peaks as the only basis of a decision whether to merge the two peaks into a single anomaly may not produce accurate results. In graph (II), two peaks (peaks P3 and P4) in the anomaly scores also exceed threshold T1. Also, the distance D2 between peaks P3 and P4 is greater than distance D1. Thus, using only the distance as the basis of the decision whether to merge the two peaks into a single anomaly, peaks P1 and P2 would be merged, and peaks P3 and P4 would not be merged. However, considering the anomaly scores below the threshold T1, merging peaks P3 and P4 instead of peaks P1 and P2 may produce more accurate results because peaks P3 and P4 are connected by anomaly scores that are higher than the surrounding areas (a plateau region 2351). If the threshold T2 (which may be an anomaly-detection threshold) was used instead of threshold T1, then peaks P3 and P4 could be quickly identified as belonging to the same anomaly region.

Figure 23B:
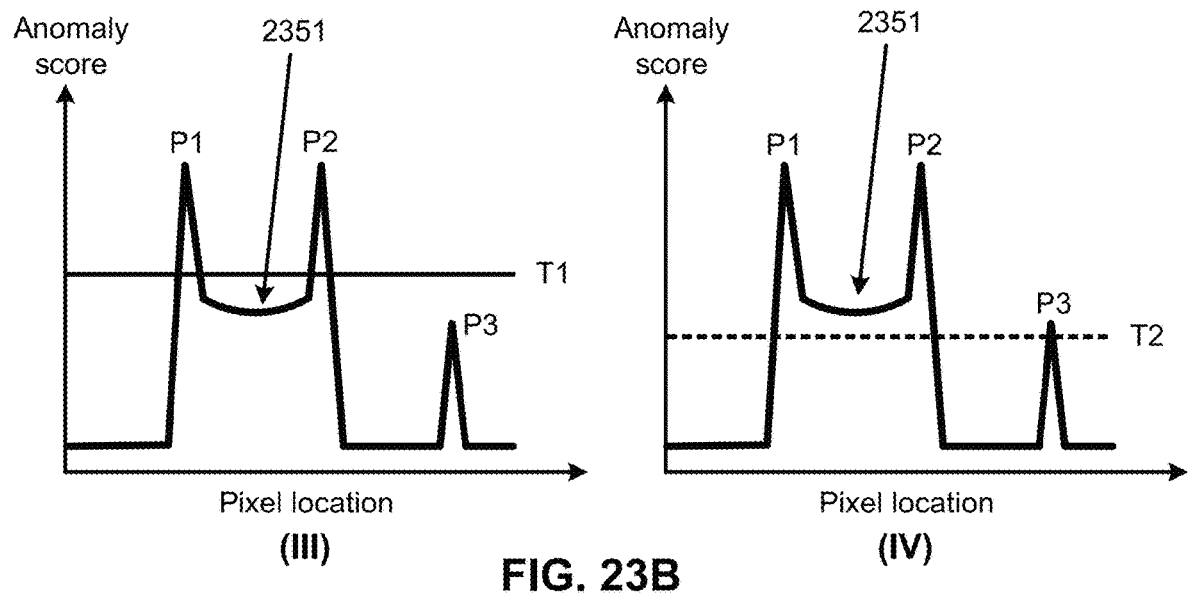
FIG. 23B illustrates example embodiments of anomaly scores.

But lowering the threshold (e.g., to threshold T2) may present other challenges. For example, FIG. 23B illustrates example embodiments of anomaly scores. The anomaly scores in graph (III) and in graph (IV) include three peaks: P1, P2, and P3. As shown by graph (III), when threshold T1 is used, peaks P1 and P2 do not appear to be connected by a plateau region 2351. And, as shown by graph (IV), when threshold T2 is used, peaks P1 and P2 are connected by a plateau region 2351, but peak P3 is also detected. Thus, lowering the threshold may introduce more noise (e.g., peak P3) into the anomaly-detection results.

Figure 24A:
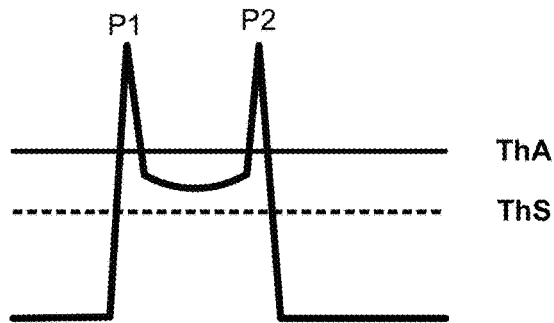
FIG. 24A illustrates an example embodiment of two threshold layers, layers ThA and ThS.

Thus, some embodiments of the detection device 100 implement an embodiment of a two-layer-threshold post-processing method or a three-or-more-layer-threshold post-processing method, to account for the dynamic variations across the images and the variation over the regions within the images. FIG. 24A illustrates an example embodiment of two thresholds, thresholds ThA and ThS.

The detection device 100 uses ThA (threshold for Anomaly detection) to determine if one or more pixels (e.g., a single pixel, a region that includes multiple pixels) have an anomaly. For a pixel to be classified as an anomaly, the pixel must have an anomaly score (e.g., an adjusted anomaly score) that is at or above ThA. Thus, any noisy pixels that have a respective anomaly score that is below ThA will not be classified as an anomaly.

The detection device uses ThA only to determine whether a pixel is an anomaly—the detection device does not use ThA to determine how big an anomaly is. To estimate the size of an anomaly, the detection device uses another threshold, ThS (threshold for Size), which is generally lower than ThA, thus allowing the detection device to obtain extra information from the respective anomaly scores of the surrounding pixels of an anomaly pixel to determine the size of the anomaly. The use of ThS also provides information that the detection device can use to determine whether to merge or filter out peaks based on the definition of anomalies.

Using the two thresholds, the detection device is accurate even if only a few pixels in a much bigger anomaly region are identified as anomalies using the higher threshold (ThA), because the overall anomaly area can be recovered using the lower threshold (ThS). This is more robust than a one-layer threshold method and allows a higher (even a much higher) ThA.

Figure 24B:
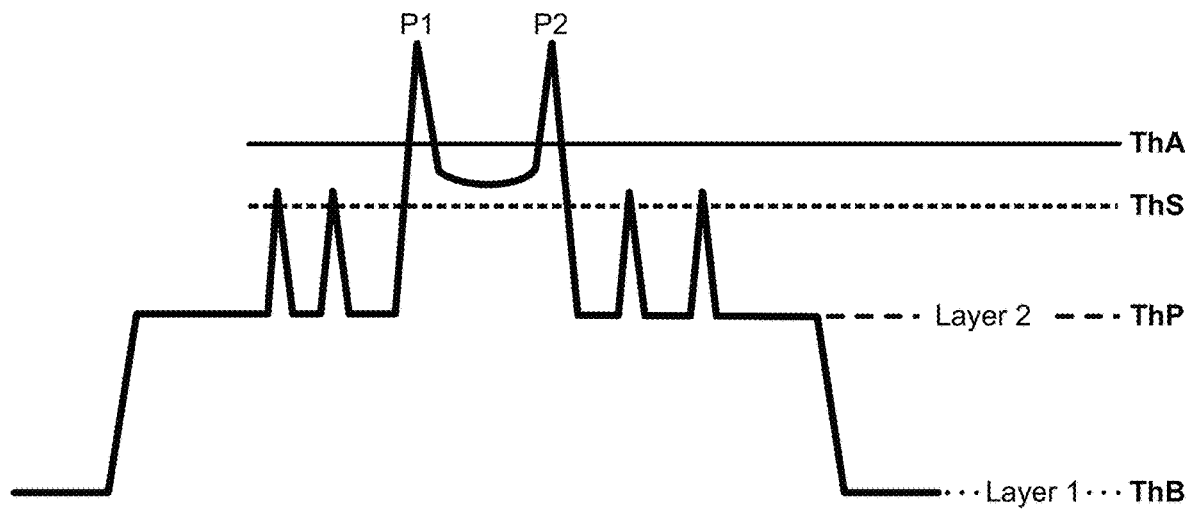
FIG. 24B illustrates an example embodiment of four threshold layers, layers ThA, ThS, ThP, and ThB.

Some embodiments of the detection device use more than two thresholds. For example, some embodiments use four thresholds. FIG. 24B illustrates an example embodiment of four thresholds: ThA, ThS, ThP, and ThB. FIG. 24B also includes two anomaly-score layers, layer 2 and layer 1, which the detection device can use to accommodate the variations of local regions within the image as well as the global variation across the image.

The detection device uses layer 1 to estimate the baseline anomaly score of the whole image to accommodate the anomaly-score differences between the input image (e.g., a test image) and the training images, particularly if the input image does not share the same range as the training images or does not have an anomaly-score distribution that is similar to the anomaly-score distribution of the training images. The detection device uses layer 1 to calculate parameters for the whole image, which may include mean, median, minimum, and maximum anomaly scores.

The detection device uses layer 2 to estimate the reference plane of the local region, which may be a plateau region, in the anomaly detection. The plateau region serves as an anchor to compensate for a local, unshaped, noisy pattern in the anomaly scores (e.g., the diffraction region 841 in FIG. 8). With the threshold ThP, the detection device can determine if a local plateau region exists, what the shape of the plateau region is, and how big the local plateau region is.

Layer 2 may be the same as layer 1 if the anomaly scores do not include any local noise patterns.

ThA and ThS may be the same as layers ThA and ThS that are described above in FIG. 24A. In some embodiments, the values of ThA and ThS are adapted image by image and region by region. Thus, the detection device can accommodate variations in the anomaly scores across images and variations in the anomaly scores across the regions within an image.

Additionally, some embodiments of the detection device do not change ThA and ThS, but rather correct the raw anomaly scores and keep ThA and ThS unchanged. Some embodiments of the correction can be described by equation (1) and equation (2).

Equation (1)

$$S_{global\text{-}corrected} = S_{raw} \frac{S_{raw}}{S_{raw} + K_B * Th_B}, \quad (1)$$

where $S_{raw}$ is the uncorrected anomaly scores; where $S_{global\text{-}corrected}$ is the global-corrected anomaly scores (corrected to accommodate the global variation of the anomaly scores from the normal training dataset); and where $K_B$ and $Th_B$ are two parameters, for example parameters calculated from a global mean or a global median of all of the uncorrected anomaly scores, for determining the global layer (e.g., layer 1 shown in FIG. 24B).

Equation (2)

$$S_{plateau\text{-}corrected} = S_{global\text{-}corrected} \frac{S_{global\text{-}corrected}}{S_{global\text{-}corrected} + K_P * Th_P}, \quad (2)$$

where $S_{global\text{-}corrected}$ is the global-corrected anomaly scores output from equation 1, where $S_{plateau\text{-}corrected}$ is the corrected anomaly scores after being adjusted due to the local variation, and where $K_p$ and $Th_p$ are two parameters for determining the plateau layer (e.g., layer 2 shown in FIG. 24B).

To differentiate a local plateau region from big anomaly regions, some embodiments of the detection device generally operate as if the anomalies are distributed sparsely, which means the size of a window can be selected to customize the size of anomaly that the detection device is attempting to detect.

Some four-layer threshold post-processing embodiments also account for the three-dimensional (3D) structure information of the object during the anomaly detection. For example, in non-destructive testing, some anomaly-detection results have a high false-positive rate in the image areas that are near or within the edges, because those areas contain high gradient information and may have some special characteristics or require a different threshold in anomaly detection. This difference can be easily accommodated by using the edge region as a plateau region. In some embodiments, the detection device can also use a model of the object being tested (e.g., a CAD model) to have a classification for each image region for better resolution on customized parameters.

Figure 25:
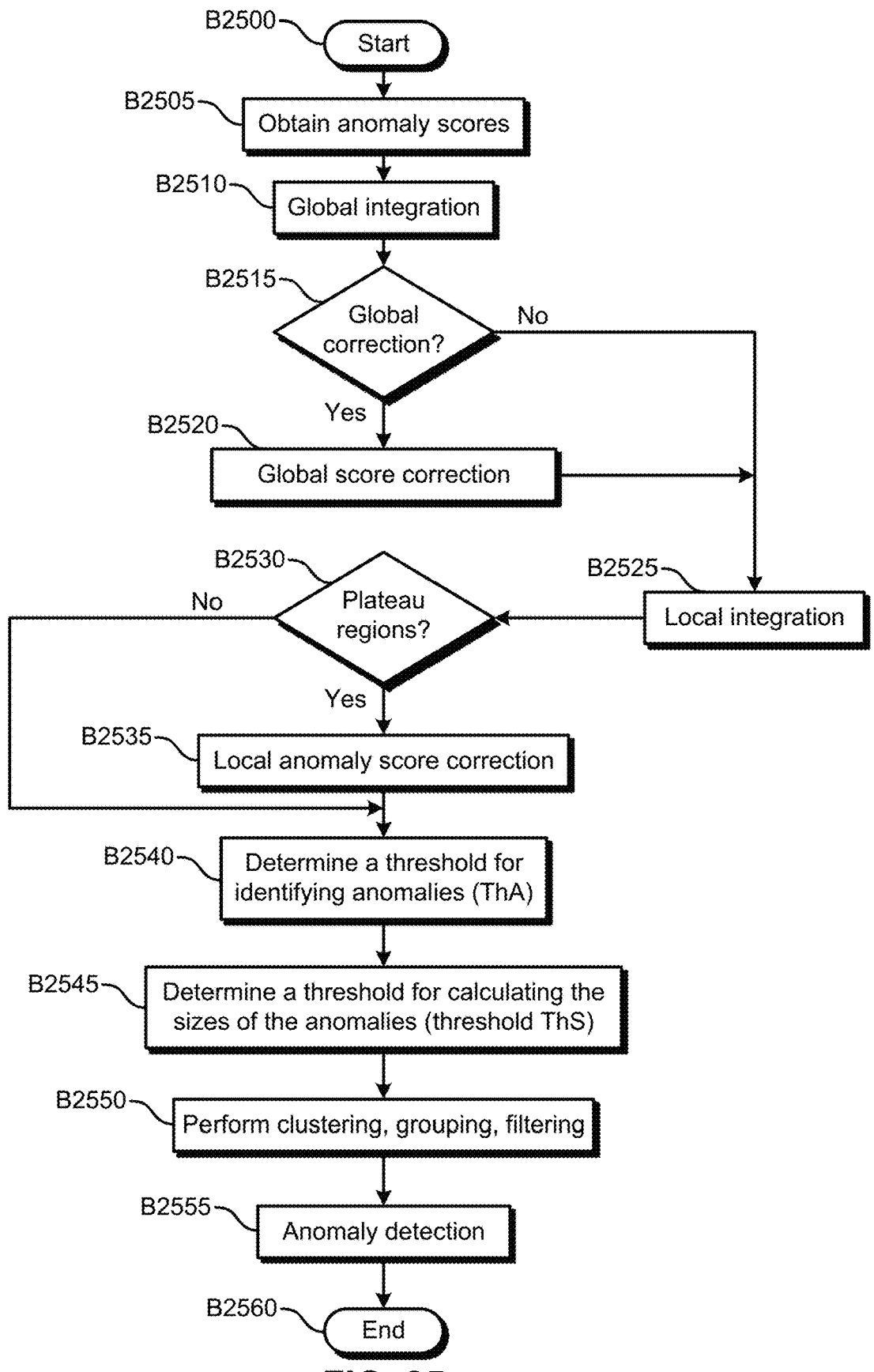
FIG. 25 illustrates an example embodiment of an operational flow for anomaly detection.

FIG. 25 illustrates an example embodiment of an operational flow for anomaly detection. The operational flow in FIG. 25 starts in block B2500 and then moves to block B2505, where the detection device obtains anomaly scores for areas (e.g., pixels, regions) in an image (e.g., a test image). Next, in block B2510, the detection device performs a global integration of the anomaly scores. For example, the detection device may obtain the statistical information of anomaly scores of all pixels in the image and then compare the statistical information with the statistical information from training images. The statistical information could be a mean, a median, or a distribution of anomaly scores.

Then in block B2515 the detection device determines whether to perform a global correction of the anomaly scores, for example because there is a global variation of the anomaly scores across the anomaly scores of different images. The variation of the global integration, from either a mean-based metric or a median-based metric, may indicate whether there is any systematic noise in the anomaly scores for the entire image.

If the detection device determines that a global correction should be performed (B2515=Yes), then the operational flow moves to block B2520. In block B2520, the detection device performs a global correction of the anomaly scores in each pixel of the image. In block B2520, the detection device may generate $K_B$ and $Th_B$, for example from a global mean or a global median of the anomaly scores, and the detection device may globally correct the anomaly scores as described by equation (1). Also for example, the global correction may be gradient-based normalization or intensity-based normalization. After block B2520, the operational flow proceeds to block B2525.

If the detection device determines that a global correction should not be performed (B2515=No), then the operational flow moves to block B2525.

In block B2525, the detection device performs a local integration of the anomaly-detection scores. For example, the detection device may obtain the statistical information of anomaly scores of the pixels in local regions in the image and compare the statistical information with the statistical information obtained from training images or estimated from the entire region in the image. Also for example, the statistical information could be a mean, a median, or the distribution of anomaly scores.

The flow then moves to block B2530, where the detection device determines if the anomaly scores include any local plateau regions. For example, to determine if the anomaly scores include any local plateau regions, some embodiments of the detection device apply a threshold to the global-corrected anomaly scores, then convert the corrected anomaly-score image into a binary-score image, where 1 indicates a possible plateau pixel and 0 indicates non-plateau pixel. Then a moving integration of the binary image is calculated and the size threshold of a plateau region is applied to finally determine if that pixel is a plateau region or not.

If the anomaly scores include at least one local plateau region (B2530=Yes), then the flow moves to block B2535, where local anomaly-score correction is performed. For example, for the areas that have been classified as plateau regions, some embodiments of the detection device apply an area-value correction, for example as described by equation (2). After block B2535, the flow moves to block B2540. Also, if the anomaly scores do not include at least one local plateau region (B2530=No), then the flow moves to block B2540 without performing block B2535.

In block B2540, the detection device determines a threshold (e.g., threshold ThA) for identifying an anomaly. Next, in block B2545, the detection device determines a threshold (e.g., threshold ThS) for calculating the respective sizes of the anomalies. Then in block B2550, the detection device performs clustering, grouping, or filtering of the anomaly scores. For example, some embodiments of the detection device combine the corrected plateau regions with the uncorrected non-plateau regions.

Figure 26:
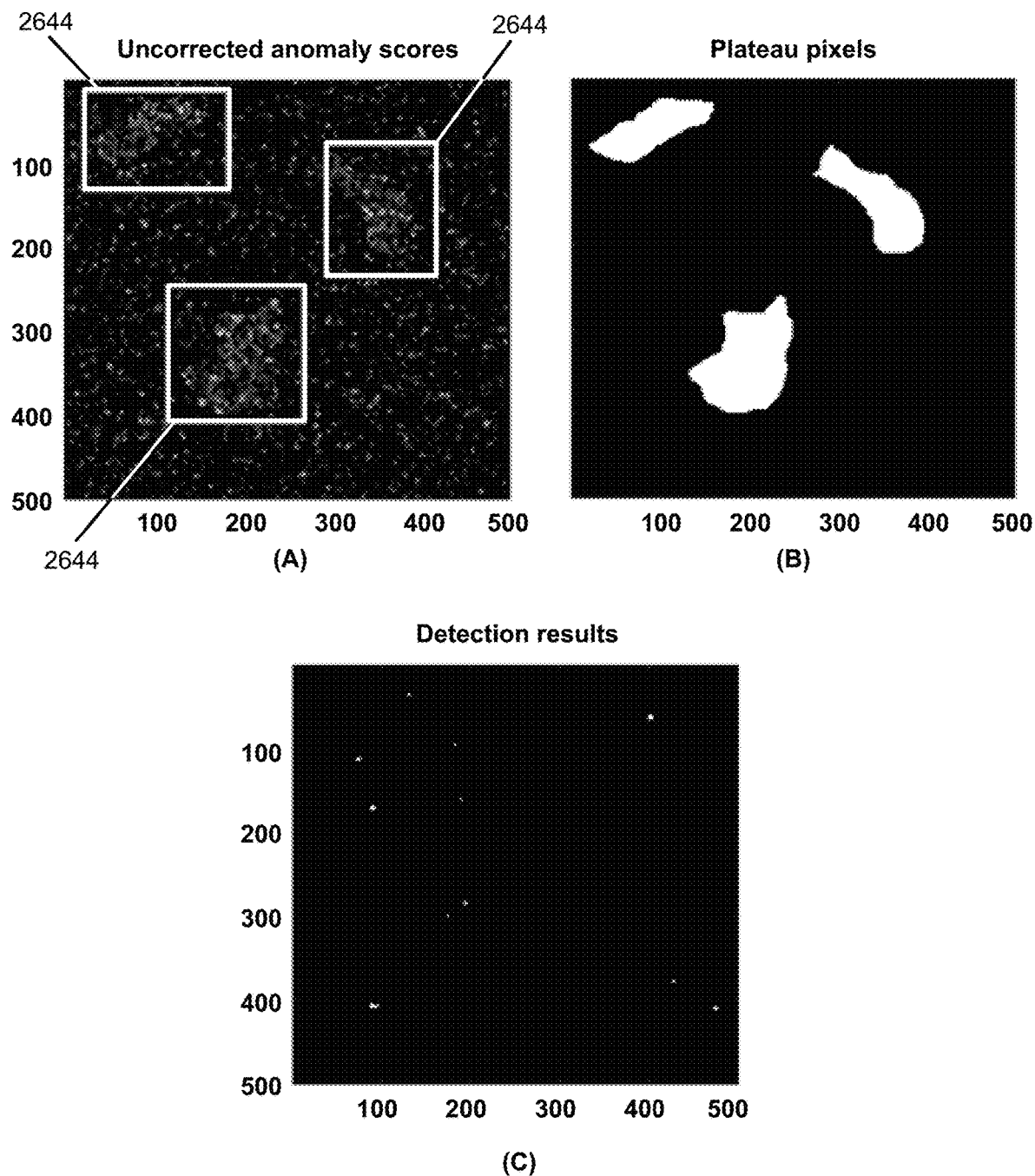
FIG. 26, which includes images (A), (B), and (C), illustrates example embodiments of anomaly-detection results.

Next, in block B2555, the detection device detects anomalies in the image and determines the sizes of detected anomalies based on the threshold for identifying an anomaly (ThA) and on the threshold for calculating the respective sizes of the anomalies (ThS). FIG. 26, which includes images (A), (B), and (C), illustrates example embodiments of anomaly-detection results.

In FIG. 26, image (A) shows the uncorrected anomaly scores from one image, and the rectangle areas 2644 show the noisy local patterns in the uncorrected anomaly scores. Image (B) shows all the pixels that have been classified as "plateau," and image (C) shows the anomaly-detection results after performing an embodiment of four-layer post-processing. The results from the four-layer post-processing are not biased because of local noise.

Figure 27:
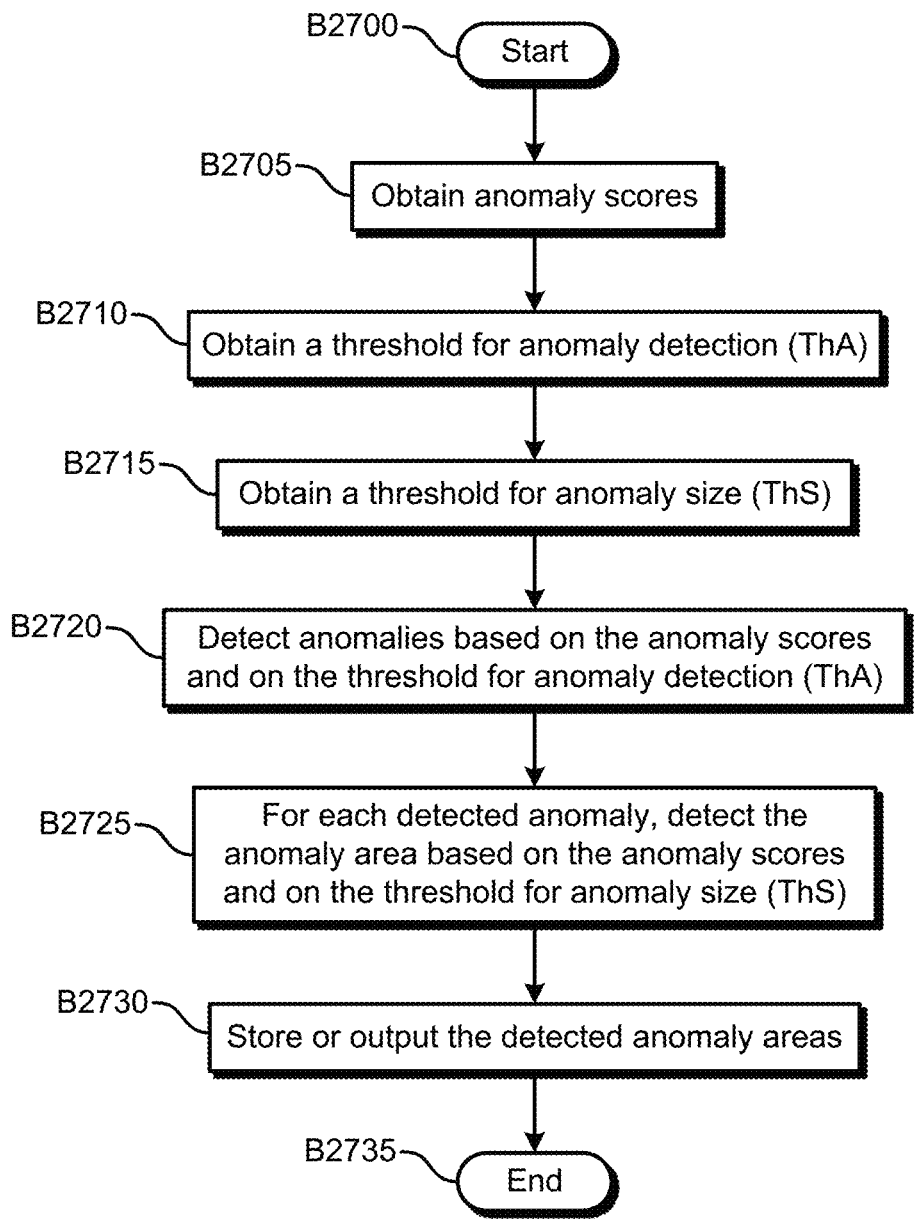
FIG. 27 illustrates an example embodiment of an operational flow for detecting anomalies and the sizes of anomalies.

FIG. 27 illustrates an example embodiment of an operational flow for detecting anomalies and the sizes of anomalies. The flow starts in block B2700 and then proceeds to block B2705, where a detection device obtains anomaly scores (e.g., raw anomaly scores, revised anomaly scores, adjusted anomaly scores, corrected anomaly scores). To obtain the anomaly scores, the detection device may generate the anomaly scores.

The flow then moves to block B2710, where the detection device obtains a threshold for anomaly detection (ThA). Next, in block B2715, the detection device obtains a threshold for anomaly size (ThS).

Then, in block B2720, the detection device detects anomalies based on the anomaly scores and on the threshold for anomaly detection (ThA).

Next, in block B2725, for each detected anomaly from block B2720, the detection device detects the anomaly area based on the anomaly scores and on the threshold for anomaly size ThS.

The flow then moves to block B2730, where the detection device stores or outputs the detected anomaly areas, and then the flow ends in block B2735.

Figure 28:
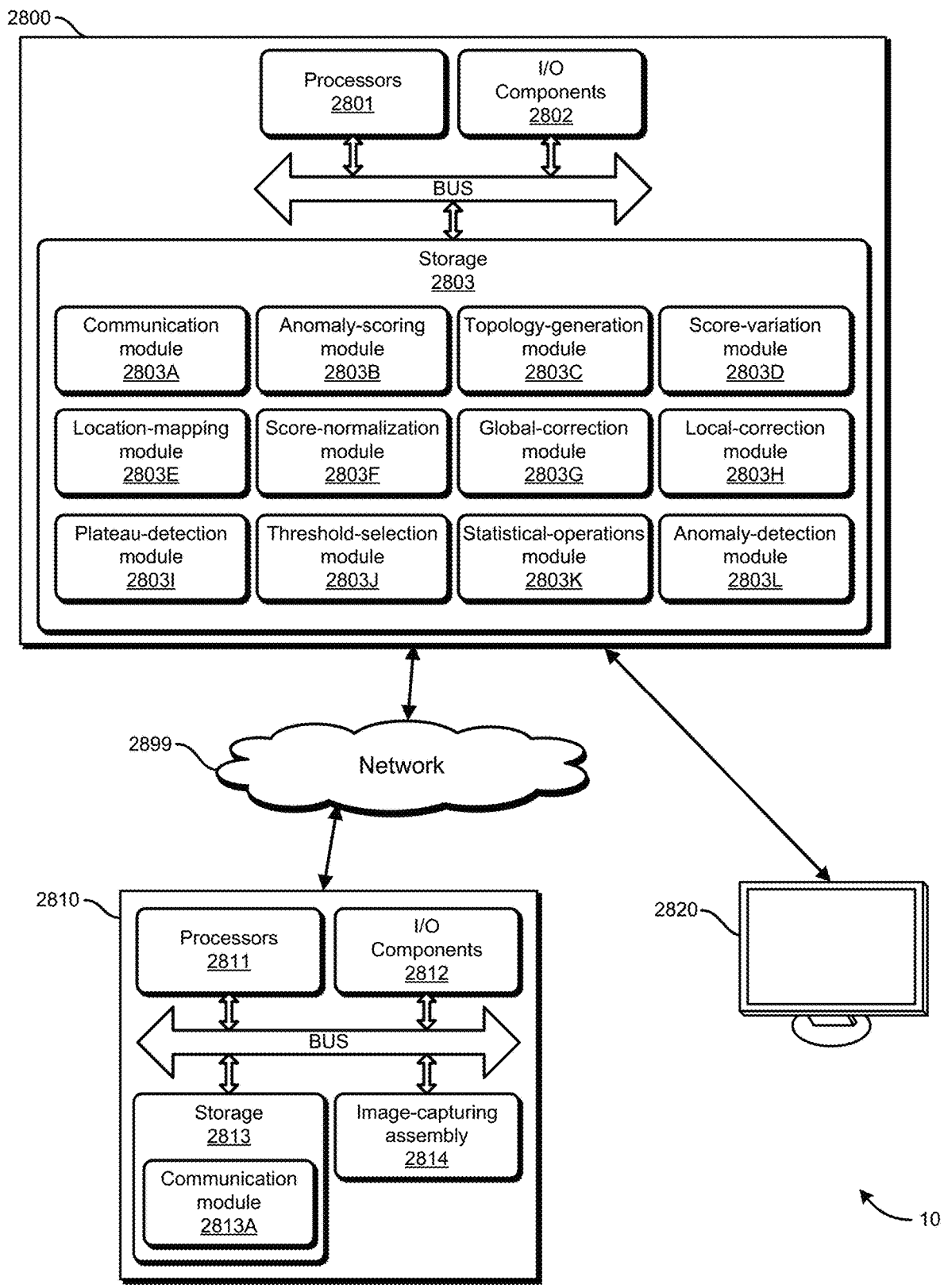
FIG. 28 illustrates an example embodiment of a system for anomaly detection.

FIG. 28 illustrates an example embodiment of a system for anomaly detection. The system 10 includes a detection device 2800, which is a specially-configured computing device; an image-capturing device 2810; and a display device 2820. In this embodiment, the detection device 2800 and the image-capturing device 2810 communicate via one or more networks 2899, which may include a wired network, a wireless network, a LAN, a WAN, a MAN, and a PAN. Also, in some embodiments of the system 10, the devices communicate via other wired or wireless channels.

The detection device 2800 includes one or more processors 2801, one or more I/O components 2802, and storage 2803. Also, the hardware components of the detection device 2800 communicate via one or more buses or other electrical connections. Examples of buses include a universal serial bus (USB), an IEEE 1394 bus, a Peripheral Component Interconnect (PCI) bus, a Peripheral Component Interconnect Express (PCIe) bus, an Accelerated Graphics Port (AGP) bus, a Serial AT Attachment (SATA) bus, and a Small Computer System Interface (SCSI) bus.

The one or more processors 2801 include one or more central processing units (CPUs), which may include microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits). The I/O components 2802 include communication components (e.g., a graphics card, a network-interface controller) that communicate with the display device 2820, the network 2899, the image-capturing device 2810, and other input or output devices (not illustrated), which may include a keyboard, a mouse, a printing device, a touch screen, a light pen, an optical-storage device, a scanner, a microphone, a drive, and a controller (e.g., a joystick, a control pad).

The storage 2803 includes one or more computer-readable storage media. As used herein, a computer-readable storage medium includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 2803, which may include both ROM and RAM, can store computer-readable data or computer-executable instructions.

The detection device 2800 also includes a communication module 2803A, an anomaly-scoring module 2803B, a topology-generation module 2803C, a score-variation module 2803D, a location-mapping module 2803E, a score-normalization module 2803F, a global-correction module 2803G, a local-correction module 2803H, a plateau-detection module 2803I, a threshold-selection module 2803J, a statistical-operations module 2803K, and an anomaly-detection module 2803L. A module includes logic, computer-readable data, or computer-executable instructions. In the embodiment shown in FIG. 28, the modules are implemented in software (e.g., Assembly, C, C++, C#, Java, BASIC, Pert, Visual Basic). However, in some embodiments, the modules are implemented in hardware (e.g., customized circuitry) or, alternatively, a combination of software and hardware. When the modules are implemented, at least in part, in software, then the software can be stored in the storage 2803. Also, some embodiments of the detection device 2800 include additional modules, omit some of these modules, combine these modules into fewer modules, or divide these modules into more modules.

The communication module 2803A includes instructions that cause the detection device 2800 to communicate with one or more other devices (e.g., the image-capturing device 2810, the display device 2820), for example to obtain one or more images from the other devices or to display images or other information on the other devices. For example, some embodiments of the communication module 2803A include instructions that cause the detection device 2800 to perform at least some of the operations that are described in blocks B210 in FIG. 2, in B620 and B670 in FIG. 6, in B2010 in FIG. 20, in B2110 in FIG. 21, or in B2210 in FIG. 22.

The anomaly-scoring module 2803B includes instructions that cause the detection device 2800 to generate respective anomaly scores (e.g., raw anomaly scores) for the detection areas (e.g., regions, pixels, voxels) in one or more images (e.g., training images, test images), to generate a respective anomaly-score image based on the respective anomaly scores, or to generate revised anomaly scores based on raw anomaly scores and on anomaly-score variations. For example, some embodiments of the anomaly-scoring module 2803B includes instructions that cause the detection device 2800 to perform at least some of the operations that are described in block B230 in FIG. 2, in blocks B630-B640 in FIG. 6, in block B710 in FIG. 7, in block B1610 in FIG.

16, in block B2035 in FIG. 20, in block B2115 in FIG. 21, in block B2215 in FIG. 22, in block B2505 in FIG. 25, or in block B2705 in FIG. 27.

The topology-generation module 2803C includes instructions that cause the detection device 2800 to generate one or more topologies based on the features in one or more images (e.g., training images), to generate a respective topology mapping between each of the one or more topologies and an image space, to store generated topologies and generated topology mappings, or to retrieve stored topologies and stored topology mappings. For example, some embodiments of the topology-generation module 2803C cause the detection device 2800 to perform at least some of the operations that are described in blocks B220, B225, and B250 in FIG. 2; in block B610 in FIG. 6; in blocks B2020-B2030 in FIG. 20; in block B2105 in FIG. 21; or in block B2205 in FIG. 22.

The score-variation module 2803D includes instructions that cause the detection device 2800 to generate anomaly-score variations (e.g., standard deviations) for a detection location based on a set of images (e.g., training images). For example, some embodiments of the score-variation module 2803D includes instructions that cause the detection device 2800 to perform at least some of the operations that are described in blocks B240 and B250 in FIG. 2.

The location-mapping module 2803E includes instructions that cause the detection device 2800 to map a detection location (e.g., pixel, region, voxel) in an image to a location in a topology, to map a location in a topology to a location in a different topology, or to map a location in a topology to a location (e.g., a detection location) in an image. For example, some embodiments of the location-mapping module 2803E include instructions that cause the detection device 2800 to perform at least some of the operations that are described in block B650 in FIG. 6, in block B670 in FIG. 6, in block B2040 in FIG. 20, in block B2090 in FIG. 20, in block B2120 in FIG. 21, in block B2145 in FIG. 21, or in blocks B2220-B2225 and B2250-B2260 in FIG. 22.

The score-normalization module 2803F includes instructions that cause the detection device 2800 to (i) generate (e.g., calculate) an anomaly-score-adjustment factor for a detection area based on a topology, (ii) to adjust the respective anomaly scores of one or more detection areas based on the anomaly-score-adjustment factor, (iii) to normalize (e.g., locally normalize) the respective anomaly scores of one or more detection areas based on the anomaly scores of neighboring detection areas in one or more topologies, or (iv) to set anomaly scores that are below a minimum value (e.g., a threshold) to a minimum value. Note that (i), (ii), and (iii) are not mutually exclusive and may have some overlap. Also, for example, some embodiments of the score-normalization module 2803F include instructions that cause the detection device 2800 to perform at least some of the operations that are described in blocks B650-B670 in FIG. 6, in blocks B720-B760 in FIG. 7, in blocks B1620-B1650 in FIG. 16, in blocks B2050-B2090 in FIG. 20, in blocks B2125-B2140 in FIG. 21, or in blocks B2230-B2245 in FIG. 22.

The global-correction module 2803G includes instructions that cause the detection device 2800 to perform a global integration on a collection (e.g., set) of anomaly scores (e.g., an anomaly-score image), determine if a global correction should be performed on a collection of anomaly scores, perform a global score correction on a collection of anomaly scores, normalize a collection of anomaly scores to a unit median, identify potential statistical outliers in a collection of anomaly scores, or replace potential statistical outliers in a collection of anomaly scores with expected inlier anomaly scores. Some embodiments of the global-correction module 2803G include instructions that cause the detection device 2800 to perform at least some of the operations that are described in blocks 2510-B2520 in FIG. 25.

The local-correction module 2803H includes instructions that cause the detection device 2800 to perform a local integration on a collection (e.g., set) of anomaly scores (e.g., an anomaly-score image), determine if a local correction should be performed on a collection of anomaly scores, perform a local score correction on a collection of anomaly scores, perform spatial smoothing on an outlier-replaced anomaly-score image, compare smoothed anomaly scores to expected anomaly scores, generate an adjustment factor to normalize smoothed anomaly scores to an expected error, or set low values of the adjustment to a minimum value. Some embodiments of the local-correction module 2803H include instructions that cause the detection device 2800 to perform at least some of the operations that are described in blocks B2525-B2535 in FIG. 25. Also, the local-correction module 2803H may call the score-normalization module 2803F or the plateau-detection module 2803I.

The plateau-detection module 2803I includes instructions that cause the detection device 2800 to detect one or more plateau regions in a collection of anomaly scores (e.g., in an anomaly-score image). Some embodiments of the plateau-detection module 2803I include instructions that cause the detection device 2800 to perform at least some of the operations that are described in block B2520 in FIG. 25.

The threshold-selection module 2803J includes instructions that cause the detection device 2800 to obtain (e.g., select, calculate, receive) one or more thresholds (e.g., ThA, ThS, ThP, ThB). Some embodiments of the threshold-selection module 2803J include instructions that cause the detection device 2800 to perform at least some of the operations that are described in blocks B2540-B2545 in FIG. 25 or in blocks B2710-B2715 in FIG. 27.

The statistical-operations module 2803K includes instructions that cause the detection device 2800 to perform a statistical estimation (e.g., a local statistical estimation) on a collection of anomaly scores over a topology or statistically characterize anomaly scores with respect to a defined topology. The score-normalization module 2803F may call the statistical-operations module 2803K.

The anomaly-detection module 2803L includes instructions that cause the detection device 2800 to detect one or more anomalies in a collection (e.g., an anomaly-score image) of anomaly scores (e.g., revised anomaly scores, adjusted anomaly scores, corrected anomaly scores) or detect the sizes of any detected anomaly areas. Some embodiments of the anomaly-detection module 2803L include instructions that cause the detection device 2800 to perform at least some of the operations that are described in blocks B2150-B2155 in FIG. 21, in blocks B2265-B2270 in FIG. 22, in blocks B2550-B2555 in FIG. 25, or in blocks B2720-B2730 in FIG. 27.

The image-capturing device 2810 includes one or more processors 2811, one or more I/O components 2812, storage 2813, a communication module 2813A, and an image-capturing assembly 2814. The image-capturing assembly 2814 includes one or more image sensors and may include one or more lenses and an aperture. The communication module 2813A includes instructions that, when executed, or circuits that, when activated, cause the image-capturing device 2810 to capture an image, receive a request for an image from a requesting device, retrieve a requested image from the storage 2813, or send a retrieved image to the requesting device (e.g., the detection device 2800).

Also, in some embodiments, the detection device 2800 includes the image-capturing assembly 2814.

Thus, some embodiments of the aforementioned systems, devices, and methods are able to better merge, cluster, group, or filter the initial noisy anomaly scores; to accommodate the variations in anomaly scores across an anomaly-score image and within the anomaly-score image; to give flexibility to add the structure or geometry information of an object; or to produce a better anomaly-detection output. And some embodiments adjust anomaly scores based on spatially varying behavior of individual images.

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

Additionally, some embodiments of the devices, systems, and methods combine at least some of the features from two or more of the embodiments that are described herein. Also, as used herein, the conjunction "or" generally refers to an inclusive "or," though "or" may refer to an exclusive "or" if expressly indicated or if the context indicates that the "or" must be an exclusive "or."

The invention claimed is:

1. A device comprising:
    one or more computer-readable storage media; and
    one or more processors that are in communication with the one or more computer-readable storage media and that are configured to cause the device to perform operations including:
        obtaining at least one first image, wherein the at least one first image is defined in an image-space topology;
        selecting at least one feature in the at least one first image;
        defining a topology based on the at least one feature, wherein the topology is different than the image-space topology;
        generating a topology mapping between the topology and the image-space topology;
        obtaining a plurality of anomaly scores, wherein each anomaly score of the plurality of anomaly scores was generated based on a respective detection area in a second image that is defined in the image-space topology;
        mapping the plurality of anomaly scores to the topology based on the topology mapping; and
        normalizing each anomaly score in the plurality of anomaly scores based on the respective neighboring anomaly scores in the topology, thereby generating normalized anomaly scores.

2. The device of claim 1, wherein the topology is a one-dimensional topology.

3. The device of claim 1, wherein the at least one first image includes a plurality of first images, and
    wherein the operations further include:
        obtaining a plurality of first-image anomaly scores that include a respective anomaly score for each detection area in the plurality of first images, and
        for each detection location in the plurality of first images, calculating a respective anomaly-score variation for the detection location based on the respective anomaly scores of the detection areas that correspond to the detection location.

4. The device of claim 3, wherein the operations further include generating the plurality of anomaly scores based on a plurality of raw anomaly scores and on the anomaly-score variations.

5. The device of claim 1, wherein normalizing each anomaly score in the plurality of anomaly scores based on the respective neighboring anomaly scores in the topology includes
    generating, in the topology, a respective adjustment factor for each detection area, and
    adjusting each anomaly score based on the respective adjustment factor of the respective detection area that corresponds to the anomaly score.

6. The device of claim 5, wherein generating, in the topology, the respective adjustment factor for each detection area includes
    smoothing the plurality of anomaly scores in the topology, wherein each anomaly score in the plurality of anomaly scores is smoothed based on the anomaly score and on anomaly scores in a respective neighborhood of the anomaly score.

7. The device of claim 1, wherein the operations further include detecting an anomaly based on the normalized anomaly scores.

8. The device of claim 7, wherein detecting the anomaly based on the normalized anomaly scores includes
    identifying one or more of the normalized anomaly scores that exceed a first threshold, and
    identifying one or more of the normalized anomaly scores that exceed a second threshold.

9. The device of claim 1, wherein the topology has three or more dimensions.

10. A method comprising:
    obtaining a mapping from an image-space topology to a first topology;
    obtaining anomaly scores for respective detection areas in an image, wherein the respective detection areas in the image are defined in the image-space topology, and wherein the first topology is different than the image-space topology;
    mapping the anomaly scores to the first topology based on the mapping;
    statistically characterizing the anomaly scores in the first topology; and
    adjusting the anomaly scores based on the statistical characterization.

11. The method of claim 10, wherein statistically characterizing the anomaly scores in the first topology includes
    identifying one or more outlier anomaly scores in the anomaly scores, and
    replacing the one or more outlier anomaly scores with one or more inlier anomaly scores.

12. The method of claim 10, wherein statistically characterizing the anomaly scores in the first topology includes smoothing the anomaly scores in the first topology, thereby generating smoothed anomaly scores.

13. The method of claim 12, wherein statistically characterizing the anomaly scores in the first topology further includes
changing the smoothed anomaly scores that are less than a threshold value to the threshold value.

14. The method of claim 12, wherein adjusting the anomaly scores based on the statistical characterization includes
after smoothing the anomaly scores in the first topology, mapping the smoothed anomaly scores in the first topology to the image-space topology, wherein each of the smoothed anomaly scores is mapped to a respective detection area in the image-space topology.

15. The method of claim 14, wherein adjusting the anomaly scores based on the statistical characterization further includes dividing each anomaly score of the anomaly scores by the smoothed anomaly score that corresponds to the same detection area as the anomaly score.

16. One or more computer-readable storage media storing computer-executable instructions that, when executed by one or more computing devices, cause the one or more computing devices to perform operations comprising:
obtaining a plurality of anomaly scores, wherein each anomaly score of the plurality of anomaly scores corresponds to a respective detection area in an image, wherein the image is defined in an image-space topology, wherein each detection area has a location in the image-space topology, and wherein each anomaly score has a location in the image-space topology that is identical to the location of the respective detection area of the anomaly score;
obtaining a mapping from the image-space topology to a non-image-space topology, wherein the non-image-space topology is different from the image-space topology;
mapping the plurality of anomaly scores to the non-image-space topology;
adjusting at least one anomaly score of the plurality of anomaly scores based on the anomaly scores that are in a respective neighborhood of the at least one anomaly score, thereby generating adjusted anomaly scores, wherein the respective neighborhood of the at least one anomaly score includes the anomaly scores of the plurality of anomaly scores that are within a predetermined distance of the at least one anomaly score in the non-image-space topology; and
identifying one of more of the adjusted anomaly scores that exceed a threshold.

17. The one or more computer-readable storage media of claim 16, wherein the respective neighborhood of the at least one anomaly score includes the anomaly scores of the plurality of anomaly scores that are within a predetermined distance of the at least one anomaly score in the image-space topology.

18. The one or more computer-readable storage media of claim 16, wherein the non-image-space topology is defined by gradient magnitude and gradient direction of respective values of pixels in the image.

19. The one or more computer-readable storage media of claim 16, wherein the non-image-space topology is a one-dimensional topology defined by respective intensity values of pixels in the image.

* * * * *